US006747642B1

(12) United States Patent
Yasumoto

(10) Patent No.: US 6,747,642 B1
(45) Date of Patent: Jun. 8, 2004

(54) METHOD AND APPARATUS FOR PROVIDING NON-PHOTOREALISTIC CARTOON OUTLINING WITHIN A 3D VIDEOGRAPHICS SYSTEM

(75) Inventor: Yoshitaka Yasumoto, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/468,109

(22) Filed: Dec. 21, 1999

Related U.S. Application Data
(60) Provisional application No. 60/117,865, filed on Jan. 29, 1999, provisional application No. 60/124,364, filed on Mar. 15, 1999, and provisional application No. 60/155,660, filed on Sep. 24, 1999.

(51) Int. Cl.[7] ............................................... G06T 17/00

(52) U.S. Cl. ....................................... 345/419; 345/473

(58) Field of Search ............................... 345/418, 419, 345/421, 422, 424, 473, 474

(56) References Cited

U.S. PATENT DOCUMENTS

| 5,091,967 A | 2/1992 | Ohsawa |
| 5,666,439 A | 9/1997 | Ishida et al. |
| 5,757,382 A | 5/1998 | Lee |
| 5,933,529 A | 8/1999 | Kim |
| 5,940,538 A | 8/1999 | Spiegel et al. |
| 5,966,134 A | 10/1999 | Arias |
| 6,021,417 A | 2/2000 | Massarksy |
| 6,026,182 A | 2/2000 | Lee et al. |
| 6,038,348 A | 3/2000 | Carley |
| 6,061,462 A | 5/2000 | Tostevin et al. |
| 6,088,487 A | 7/2000 | Kurashige |

OTHER PUBLICATIONS

White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).

"RenderMan Interface Specification Version 3.1," Pixar Animation Studios (Sep. 1989).

"RenderMan Artist Tools, PhotoRealistic RenderMan 3.8 User's Manual," Pixar (Aug. 1998).

"RenderMan Interface Version 3.2" (Jul. 2000).

Peter J. Kovach, *Inside Direct 3D*, "Alpha Testing," pp 289–291 (1999).

(List continued on next page.)

*Primary Examiner*—Cliff N. Vo
(74) *Attorney, Agent, or Firm*—Nixon & Vanderhye P.C.

(57) ABSTRACT

In a 3D computer graphics system such as a 3D home video game console, efficient techniques for generating non-photorealistic effects such as cartoon outlining involve generating and displaying border lines at object edges based on contents of a pixel memory. Some techniques use depth (Z) values to determine which pixels are located at object edges, and selectively blend border coloration into those pixels which are then displayed. Object edges are located by comparing pixel depth values with neighboring pixel depth values (e.g., calculating a "distance" value based on the absolute values of the distance(s) between a pixel's depth and depths of neighboring pixels). A desired border line color is blended into the pixel's color value based on the calculated distance value. In one particular example, the distance value is used to calculate a pixel Alpha value which is then used to control the amount of border color that is blended into the pixel color. The Alpha value may be modulated by pixel depth. Other techniques may cause object portions with identification values stored in frame buffer locations normally used to store Alpha values. These ID values can be used to identify object portion intersections for applying a border line color to.

67 Claims, 20 Drawing Sheets

(3 of 20 Drawing Sheet(s) Filed in Color)

OTHER PUBLICATIONS

Neider, et al., Open GL Programming Guide, The Official Guide to Learning OpenGL, Release 1, pp 301–302 (1993).

Web site information, CartoonReyes, REM Infografica, http://www.digimotion.co.uk/cartoonreyes.htm.

Raskar, Ramesh et al., "Image Precision Silhouette Edges," *Symposium on Interactive 3D Graphics 1999*, Atlanta, 7 pages (Apr. 26–29, 1999).

Schlechtweg, Stefan et al., Rendering Line–Drawings with Limited Resources, *Proceedings of GRAPHICON '96, 6th International Conference and Exhibition on Computer Graphics and Visualization in Russia*, (St. Petersburg, Jul. 1–5, 1996) vol. 2, pp 131–137.

Haeberli, Paul et al., "Texture Mapping as a Fundamental Drawing Primitive," *Proceedings of the Fourth Eurographics Workshop on Rendering*, 11pages, Paris, France (Jun. 1993).

Schlechtweg, Stefan et al., "Emphasising in Line–drawings," *Norsk samarbeid innen grafisk databehandling: NORSIGD Info, medlemsblad for NORSIGD*, Nr 1/95, pp. 9–10.

Markosian, Lee et al., "Real–Time Nonphotorealistic Rendering," Brown University site of the NSF Science and Technology Center for Computer Graphics and Scientific Visualization, Providence, RI, 5 pages (undated).

Feth, Bill, "Non–Photorealistic Rendering," wif3@cornell.edu, CS490—Bruce Land, 5 pages (Spring 1998).

Elber, Gershon, "Line Art Illustrations of Parametric and Implicit Forms," *IEEE Transactions on Visualization and Computer Graphics*, vol. 4, No. 1, Jan.–Mar. 1998.

Zeleznik, Robert et al."SKETCH: An Interface for Sketching 3D Scenes," *Computer Graphics Proceedings, Annual Conference Series 1996*, pp. 163–170.

*Computer Graphics World*, Dec. 1997.

Reynolds, Craig, "Stylized Depiction in Computer Graphics, Non–Photorealistic, Painterly and 'Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages, Jun. 1998, http://www.pixar.com/products/renderman/toolkit/Toolkit/AppNotes/appnote.24.html.

Decaudin, Philippe, "Cartoon–Looking Rendering of 3D Scenes," Syntim Project Inria, 6 pages, http://www–syntim.inria.fr/syntim/recherche/decaudin/cartoon–eng.html.

Hachigian, Jennifer, "Super Cel Shader 1.00 Tips and Tricks," 2 pages, wysiwyg://thePage.13/http://members.xoom.com/_XMCM.jarvia/3D/celshade.html.

Digimation Inc., "The Incredible Comicshop," info sheet, 2 pages, http://www.digimation.com/asp/product/asp?product_id=33.

Softimage/3D Full Support, "Toon Assistant," 1998 Avid Technology, Inc., 1 page, http://www.softimage.com/3dsupport/techn...uments/3.8/features3.8/rel_notes.56.html.

Cambridge Animo—Scene III, info sheet, Cambridge Animation Systems, 2 pages, http://www.cam–ani.co.uk/casweb/products/software/SceneIII.htm.

Mulligan, Vikram, "Toon," info sheet, 2 pages, http://digitalcarversguild.com/products/toon/toon.thml.

Toony Shaders, "Dang I'm tired of photorealism," 4 pages, http://www.visi.com/~mcdonald/toony.html.

"Cartoon Shading, Using Shading Mapping," 1 page, http://www.goat.com/alias/shaders.html#toonshad.

Web site information, CartoonReyes, http://www.zentertainment.com/zentropy/review/cartoonreyes.html.

VIDI Presenter 3D Repository, "Shaders." 2 pages, http://www.webnation.com/vidirep/panels/renderman/shaders/toon.phtml.

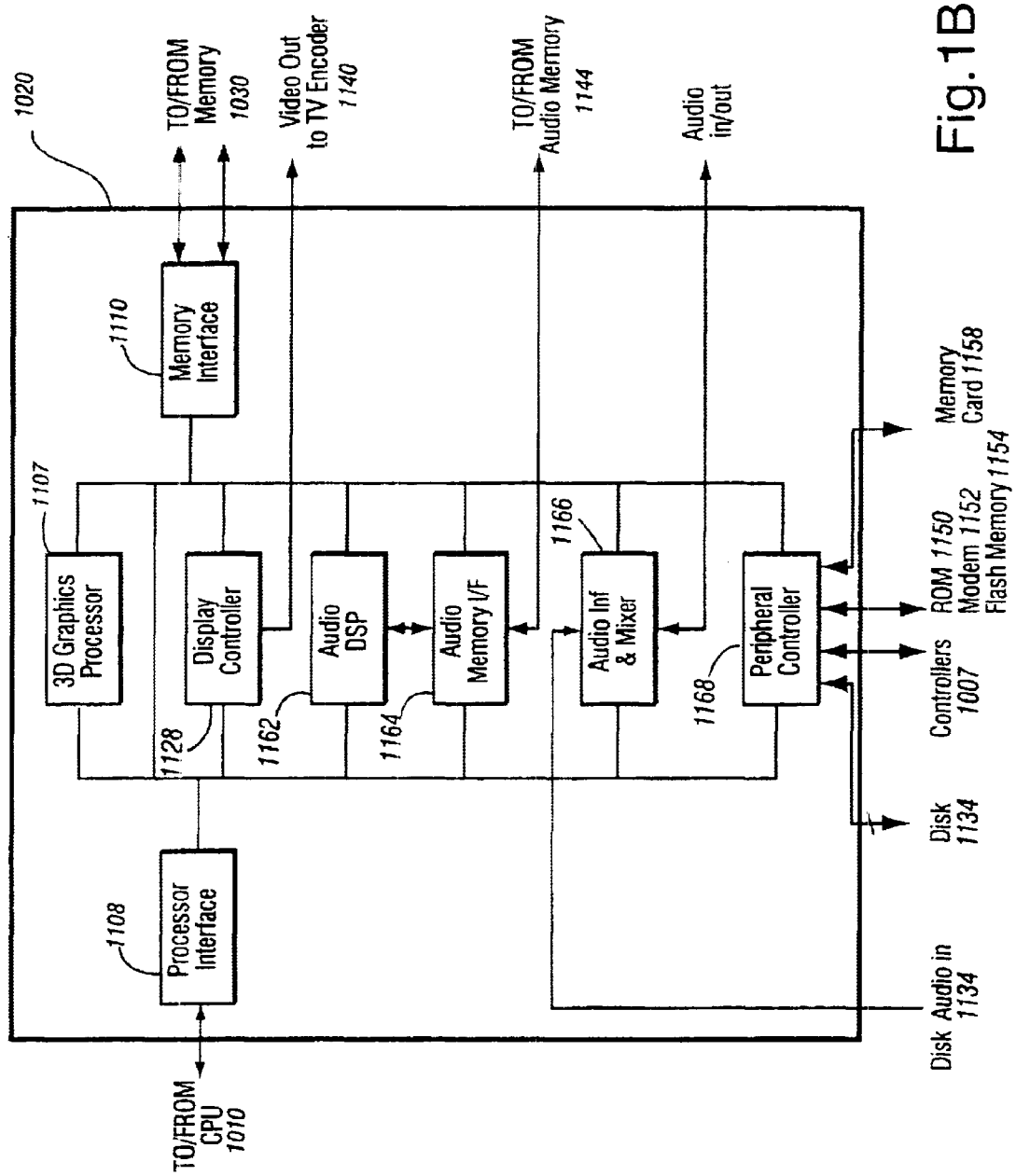

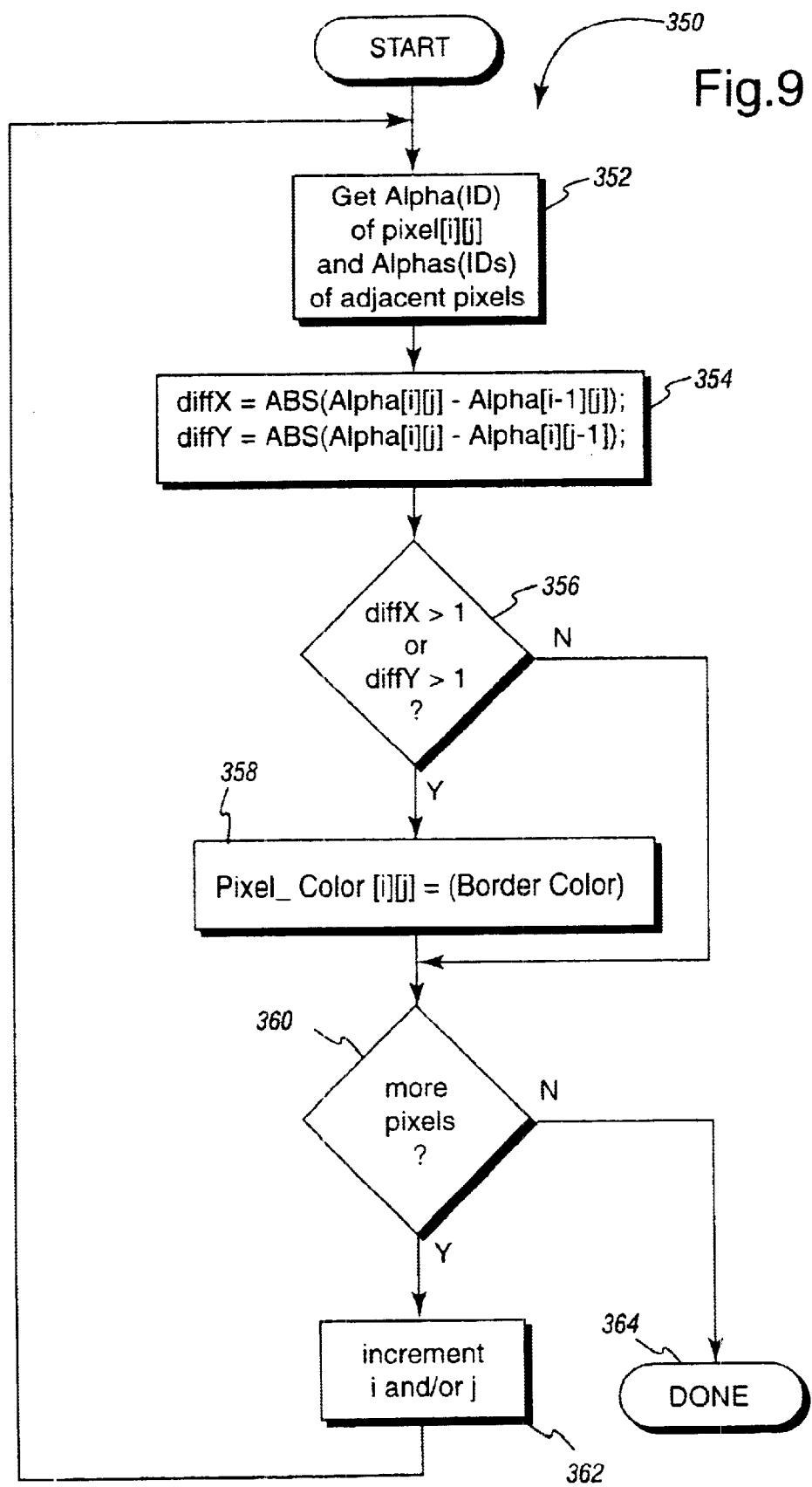

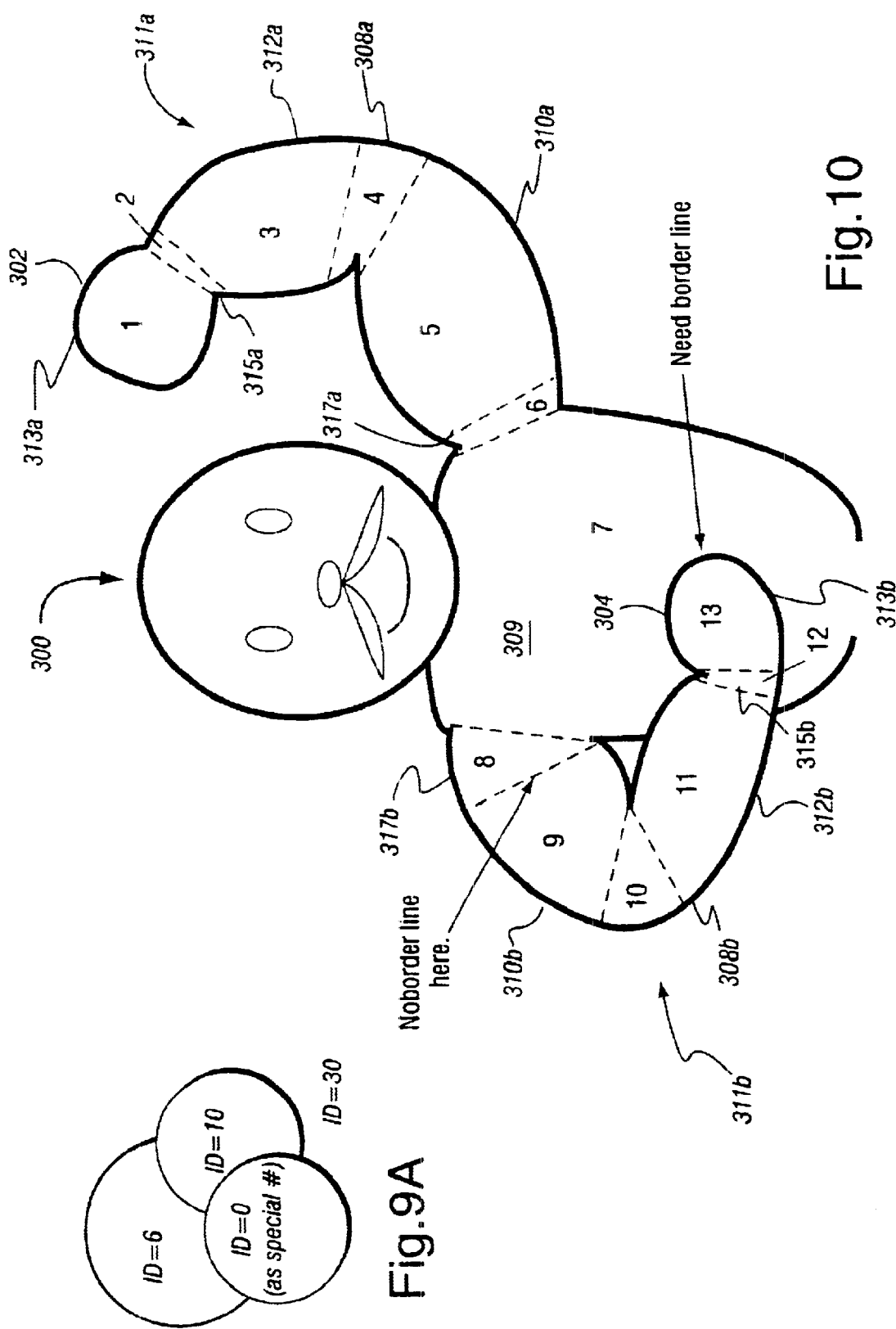

METHOD AND APPARATUS FOR PROVIDING NON-PHOTOREALISTIC CARTOON OUTLINING WITHIN A 3D VIDEOGRAPHICS SYSTEM

This application claims the benefit of U.S. Provisional Application No. 60/117,865, filed Jan. 29, 1999; Provisional Application No. 60/124,364 filed Mar 15, 1999; and Provisional Application No. 60/155,660 filed Sep. 24, 1999, the entire contents of which are hereby incorporated by reference in this application.

FIELD OF THE INVENTION

The present invention relates to 3D computer graphics, and more particularly, to non-photorealistic 3D imaging. Still more particularly, the present invention relates to methods and apparatus for computer generation and display of borders such as lines on silhouette and other edges of 3D objects.

BACKGROUND AND SUMMARY OF THE INVENTION

Most computer graphics research has tended to focus on producing realistic images. This research has been very successful. Computers can now generate images that are so realistic that you can't tell them apart from photographs. For example, many of us have seen very convincing dinosaurs, aliens and other photorealistic computer-generated special effects in movie and television. New pilots train on computer-based flight simulators so realistic that they nearly duplicate actual flying. Low-cost home video game systems can now provide a remarkable degree of realism, giving the game player an illusion of driving a real race car along a track, skiing down a snow and ice covered ski slope, walking through a medieval castle, or the like. For most games, this illusion of realism significantly enhances the game play experience.

Sometimes, however, a non-realistic image is preferable. For example, some types of interactive video and computer games provide entertainment value not by realistically simulating the real (or an imaginary) world, but instead by creating and displaying a cartoon world full of intentionally unrealistic caricature-like cartoon characters. Such games may, for example, attempt to duplicate a hand-drawn comic-book look while providing motion, speech and interactivity. In such 3D computer graphics systems, one desirable visual effect is to provide distinct solid borders such as lines at the silhouette and other edges of displayed objects. Such border lines can add clarity to certain images, e.g., helping the user to more clearly distinguish between different surfaces such as for example the outlines of a cartoon character, the hills and mountains of a landscape, the edges of walls, etc.—and the border lines may help create a desired impression of being hand-drawn by a cartoon artist.

One way to provide non-photorealistic effects such as border lines around the edges of characters or other objects such is to define separate line objects adjacent to the edges of the polygons modeling the object. But defining separate border objects can significantly increase image processing complexity. In a limited resource system, this approach could slow down image generation or otherwise sacrifice performance. Efficiency is especially important in low cost 3D graphics systems such as for example interactive 3D video game systems. More efficient techniques for generating visual effects are less taxing on scarce system resources, and therefore can enhance the overall visual experience without significantly sacrificing speed and other performance.

The present invention solves this problem by providing efficient techniques for displaying border lines at silhouette and other edges within a 3D videographics system such as a home video game console. In accordance with one aspect of the invention, border lines are generated after an image has been rendered into a frame buffer. The present invention uses values stored in the frame buffer to determine which pixels are located at silhouette or other certain edges of the object, and selectively blends border coloration into those pixels which are then displayed.

In accordance with one exemplary embodiment, silhouette edges are located by comparing pixel depth values with neighboring pixel depth values. In one particular example, a "distance" value is calculated based on the absolute values of the distance(s) between a pixel's depth and depths of neighboring pixels. A desired border line color is then blended into the pixel's color value based on the calculated distance value. In one particular example, the distance value is used to calculate a pixel Alpha value, and the Alpha value is used to control the amount of border color that is blended into the pixel color.

Another example incorporates depth modulation. In this example, a pixel Alpha value is calculated based on both the distance value and a further value that is a function of pixel depth to provide an Alpha value that is modulated by the pixel's depth value. The border color is then blended into the pixel color based on the depth-modulated Alpha value.

A further embodiment draws border lines on certain internal edges of an object not on the object's silhouette, but which a cartoon artist might nevertheless apply a border line to. Consider, for example, the situation in which a cartoon character's arm is held in front of his body. A cartoon artist would draw border lines around the silhouette of the character's arm—even if the character is holding the arm in front of his torso such that the arm's silhouette edges are actually internal to the character's overall silhouette. In accordance with a further feature of the present invention, pixels of the image are assigned different identification values—which ID values may be stored for example in frame buffer memory locations typically reserved for Alpha values. These pixel identification values are used to distinguish between border line edges and edges to which no border line is to be applied.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

These and other features and advantages provided by the present invention will be better and more completely understood by referring to the following detailed description of preferred embodiments in conjunction with the drawings of which:

FIG. 9 is a flowchart of an example routine for processing the identification values of FIG. 8A;

FIG. 9A is a schematic illustration of a further coding variation; and

FIGS. 10 and 11 show example object portion identification value coding to achieve cartoon outlining effects.

DETAILED DESCRIPTION OF PRESENTLY PREFERRED EXAMPLE EMBODIMENTS

Figure 1:
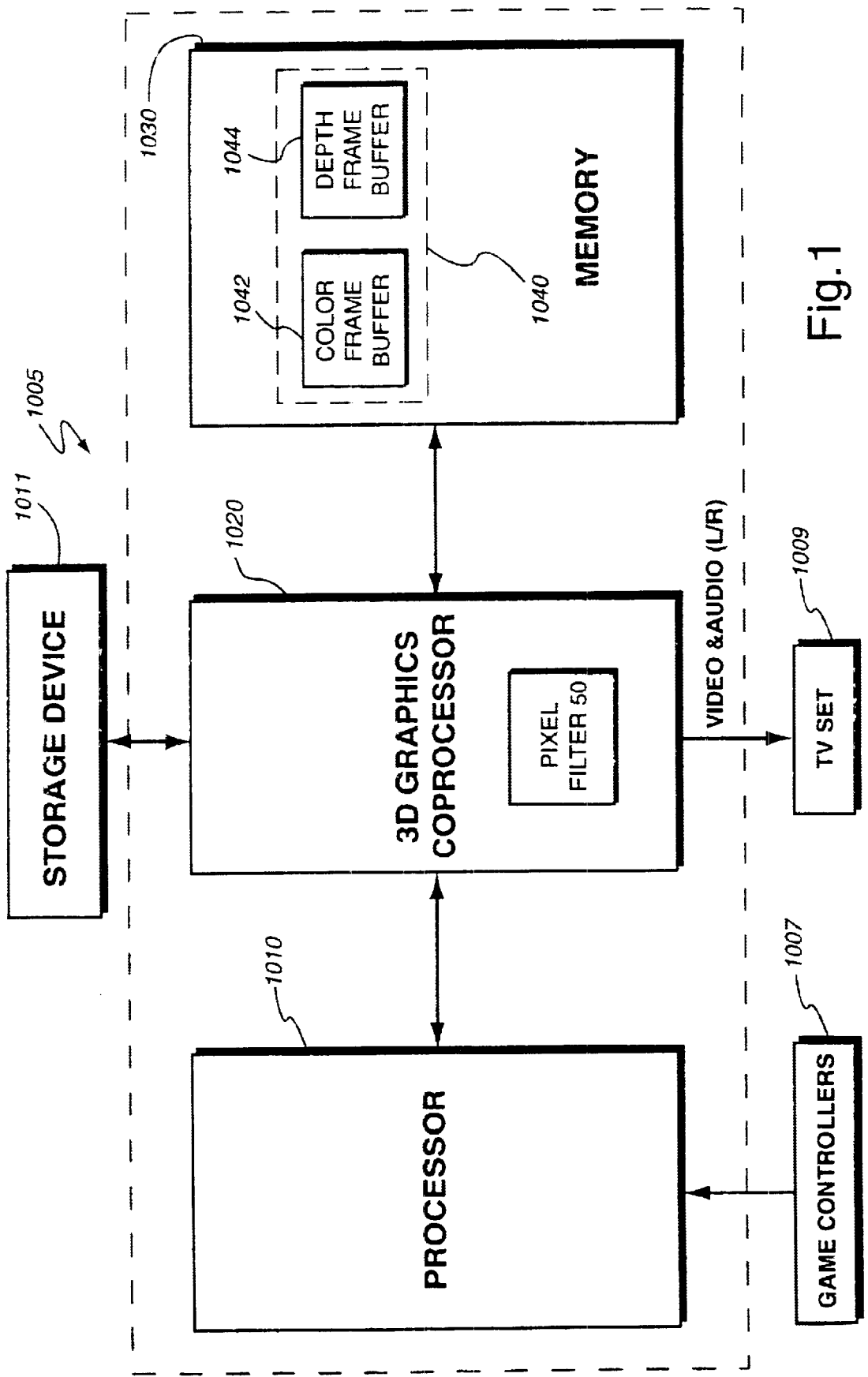
FIGS. 1–1F show example 3D videographics systems that can be used to embody this invention.

FIG. 1 shows an example 3D videographics system 1005 for displaying border lines in accordance with the present invention.

System 1005 responds to interactive real time inputs from e.g., game controllers 1007 and/or other manual input devices, and generates a visual display on a display device 1009 (e.g., a home color television set, video monitor or other display). System 1005 may operate under control of a computer program such as a video game program stored in an external storage medium 1011 (e.g., an interchangeable video game cartridge, a CD-ROM or other optical disk, etc.)

In this example, system 1005 includes a processor 1010, a 3D graphics coprocessor 1020, and a memory 1030. Processor 1010 provides 3D graphics commands to graphics coprocessor 1020. Graphics coprocessor 1020 acts on these 3D graphics commands to interactively generate 2D views of a 3D world. For example, graphics coprocessor 1020 may include a hardware-based 3D graphics pipeline that manipulates graphics primitives such as polygons defined within three-dimensional space, and generates pixels representing a visual 2D image of the three-dimensional space projected onto a viewing plane based on an arbitrarily selected viewpoint. In this example, the user can change the viewpoint on a real-time interactive basis by operating game controllers 1007.

Graphics coprocessor 1020 stores display pixels it generates in a frame buffer 1040 within memory device 1030. Frame buffer 1040 comprises a color frame buffer 1042 and a depth (Z) buffer 1044. In this example, color frame buffer 1042 stores a two-dimensional array of red, green and blue (RGB) color values and corresponding Alpha (A) values. There may be a one-to-one correspondence between the stored RGB color values and pixels to be displayed to on display 1009, or frame buffer 1042 may store sub-samples. Z buffer 1044 stores depth values (e.g., distance in the z direction relative to the viewpoint) for each pixel or sub-pixel stored in the color frame buffer. As is well known, z buffer 1044 is used for various purposes (e.g., hidden surface removal) as the graphics pipeline "builds" the image.

In the preferred embodiment, the contents of color frame buffer 1042 and/or z buffer 1044 also play a role in selectively blending border colors into pixel color values stored within color frame buffer 42 to define border lines at object edges. In more detail, system 1005 may also include a pixel filter 50. Pixel filter 50 may process pixel values of an image rendered by 3D graphics coprocessor 1020 to selectively apply border line colors to particular pixels on the silhouette and/or other edges of objects to be displayed. Pixel filter 50 in the preferred embodiment operates in a pixel post-processing phase after the image data has been rendered into frame buffer 1040 or other pixel memory. As one example, pixel filter 50 may apply border line non-photorealistic image elements to image data rendered and buffered within 3D graphics coprocessor 1020 during a process of uniting the image data out of the graphics coprocessor and into memory 1030.

Figure 1A:
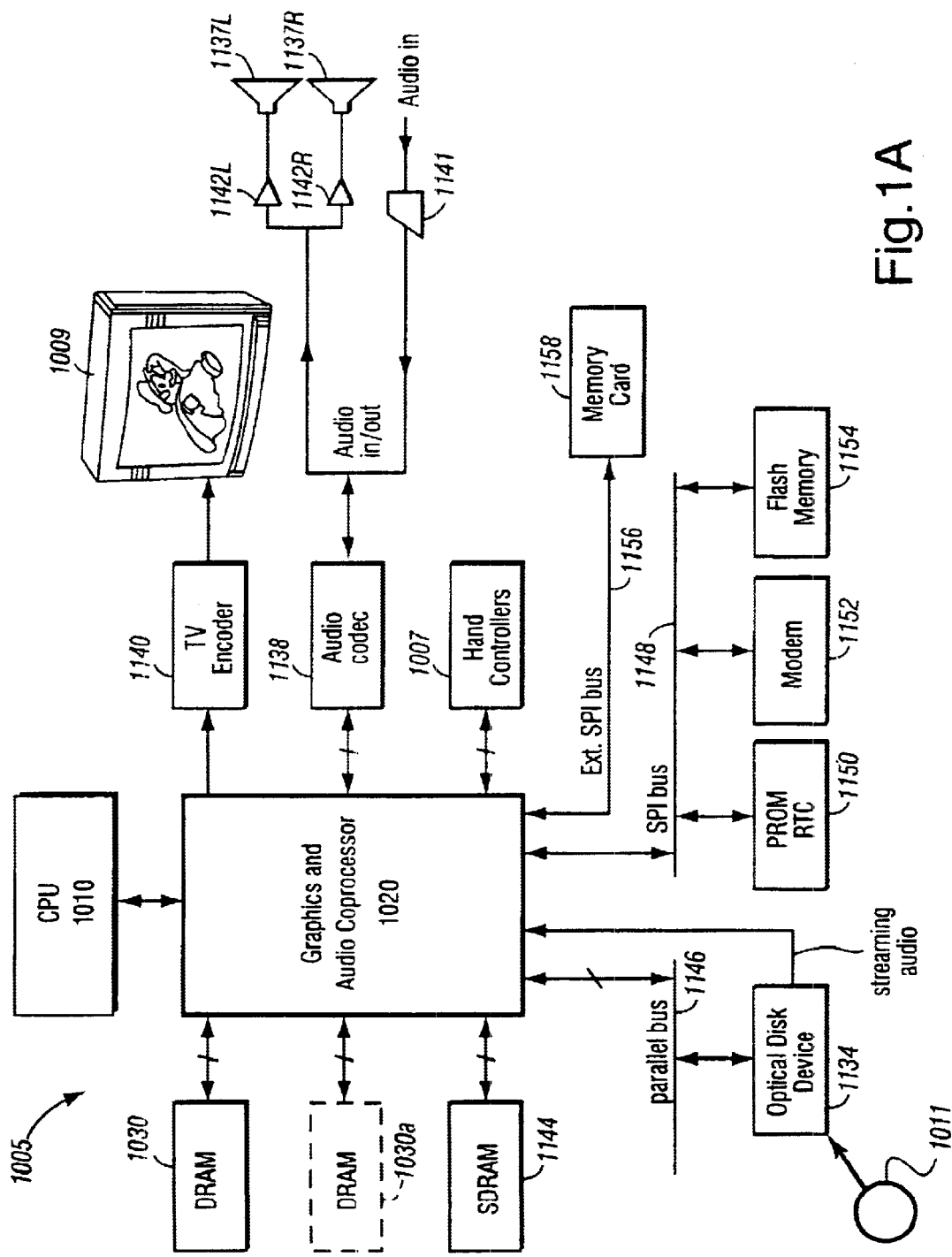

FIG. 1A is a more detailed schematic diagram of an overall example interactive 3D computer graphics system 1005 in which the present invention may be practiced. System 1005 can be used to play interactive 3D video games accompanied by interesting stereo sound. Different games can be played by inserting appropriate storage media such as optical disks 1011 into an optical disk player 1134. A game player can interact with system 1005 in real time by manipulating input devices such as handheld controllers 1007, which may include a variety of controls such as joysticks, buttons, switches, keyboards or keypads, etc.

In this example, main processor 1010 receives inputs from handheld controllers 1007 (and/or other input devices) via coprocessor 1005. Main processor 1010 interactively responds to such user inputs, and executes a video game or other graphics program supplied, for example, by external storage 1011. For example, main processor 1010 can perform collision detection and animation processing in addition to a variety of real time interactive control functions.

Main processor 1010 generates 3D graphics and audio commands and sends them to graphics and audio coprocessor 1020. The graphics and audio coprocessor 1020 processes these commands to generate interesting visual images on a display 1009 and stereo sounds on stereo loudspeakers 1137R, 1137L or other suitable sound-generating devices.

System 1005 includes a TV encoder 1140 that receives image signals from coprocessor 1005 and converts the image signals into composite video signals suitable for display on a standard display device 1009 (e.g., a computer monitor or home color television set). System 1005 also includes an audio codec (compressor/decompressor) 1138 that compresses and decompresses digitized audio signals (and may also convert between digital and analog audio signaling formats). Audio codec 1138 can receive audio inputs via a buffer 1141 and provide them to coprocessor 1020 for processing (e.g., mixing with other audio signals the coprocessor generates and/or receives via a streaming audio output of optical disk device 1134). Coprocessor 1020 stores audio related information in a memory 1144 that is dedicated to audio tasks. Coprocessor 1020 provides the resulting audio output signals to audio codec 1138 for decompression and conversion to analog signals (e.g., via buffer amplifiers 1142L, 1142R) so they can be played by speakers 1137L, 1137R.

Coprocessor 1020 has the ability to communicate with various peripherals that may be present within system 1005. For example, a parallel digital bus 1146 may be used to communicate with optical disk device 1134. A serial peripheral bus 1148 may communicate with a variety of peripherals including, for example, a ROM and/or real time clock 1150, a modem 1152, and flash memory 1154. A further external serial bus 1156 may be used to communicate with additional expansion memory 1158 (e.g., a memory card).

FIG. 1B is a block diagram of example components within coprocessor 1020. Coprocessor 1020 may be a single integrated circuit including a 3D graphics processor 1107, a processor interface 1108, a memory interface 1110, an audio digital signal processor (DSP) 1162, an audio memory interface (I/F) 1164, an audio interface and mixer 1166, a peripheral controller 1168, and a display controller 1128.

3D graphics processor 1107 performs graphics processing tasks, and audio digital signal processor 1162 performs audio processing tasks. Display controller 1128 accesses image information from memory 1030 and provides it to TV encoder 1140 for display on display device 1009. Audio interface and mixer 1166 interfaces with audio codec 1138, and can also mix audio from different sources (e.g., a streaming audio input from disk 1011, the output of audio DSP 1162, and external audio input received via audio codec 1138). Processor interface 1108 provides a data and control interface between main processor 1010 and coprocessor 1020. Memory interface 1110 provides a data and control interface between coprocessor 1020 and memory 1030. In this example, main processor 1010 accesses main memory 1030 via processor interface 1108 and memory controller 1110 that are part of coprocessor 1020. Peripheral controller 1168 provides a data and control interface between coprocessor 1020 and the various peripherals mentioned above (e.g., optical disk device 1134, controllers 1007, ROM and/or real time clock 1150, modem 1152, flash memory 1154, and memory card 1158). Audio memory interface 1164 provides an interface with audio memory 1144.

Figure 1C:
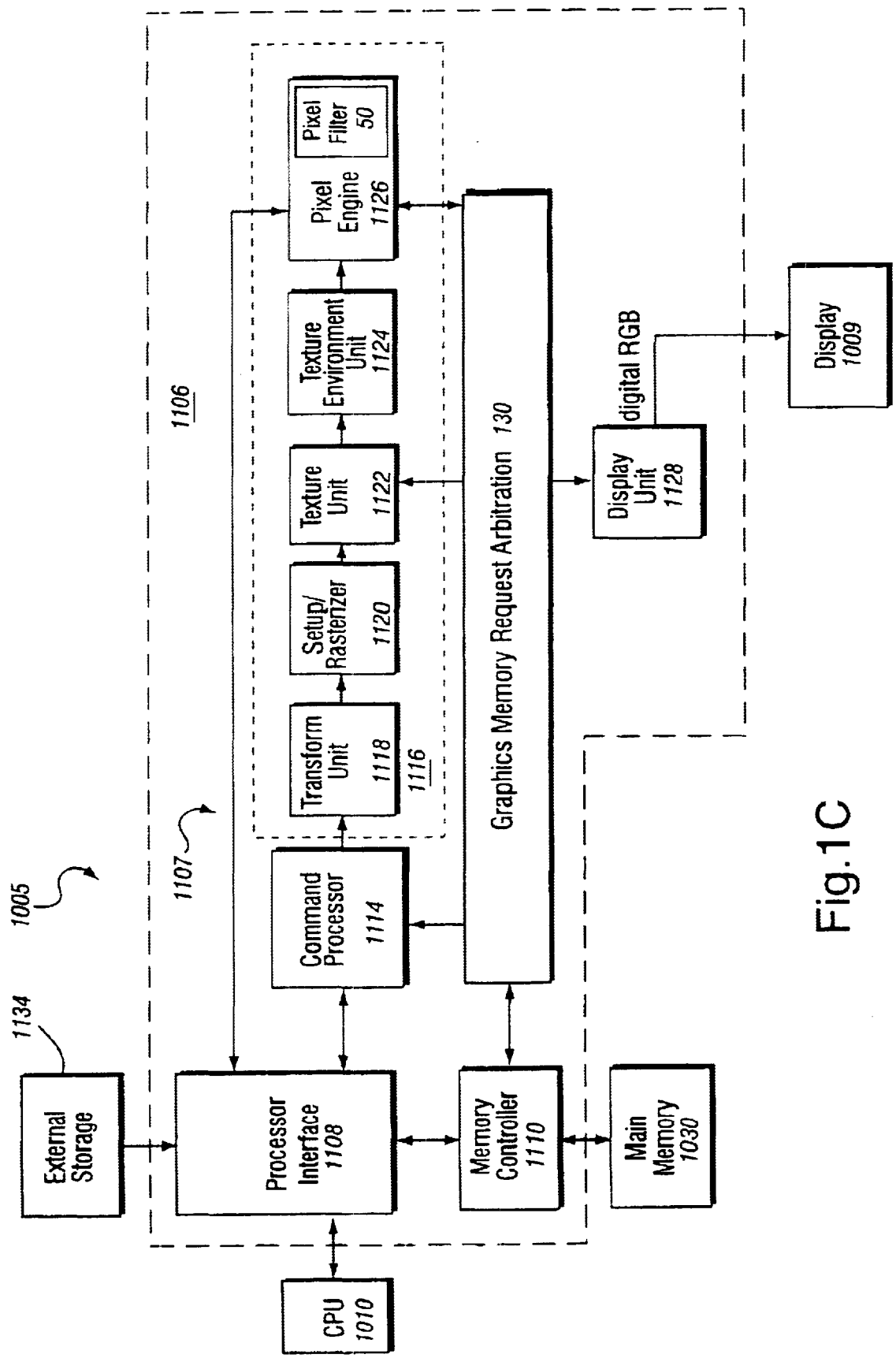

FIG. 1C shows a more detailed view of 3D graphics processor 1107 and associated components within coprocessor 1020. 3D graphics processor 1107 includes a command processor 1114 and a 3D graphics pipeline 1116. Main processor 1010 communicates streams of graphics data (i.e., display lists) to command processor 1114. Command processor 1114 receives these display commands and parses them (obtaining any additional data necessary to process them from memory 1030), and provides a stream of vertex commands to graphics pipeline 1116 for 3D processing and rendering. Graphics pipeline 1116 generates a 3D image based on these commands. The resulting image information may be transferred to main memory 1030 for access by display controller 128—which displays the frame buffer output of pipeline 1116 on display 1009. A memory arbitration circuitry 130 arbitrates memory access between graphics pipeline 1116, command processor 1114 and display unit 128.

As shown in FIG. 1C, graphics pipeline 1116 may include transform unit 1118, a setup/rasterizer 1120, a texture unit 1122, a texture environment unit 1124 and a pixel engine 1126. In graphics pipeline 1116, transform unit 1118 performs a variety of 3D transform operations, and may also perform lighting and texture effects. For example, transform unit 1118 transforms incoming geometry per vertex from object space to screen space; transforms incoming texture coordinates and computes projective texture coordinates; performs polygon clipping; performs per vertex lighting computations; and performs bump mapping texture coordinate generation. Set up/rasterizer 1120 includes a set up unit which receives vertex data from the transform unit 1118 and sends triangle set up information to rasterizers performing edge rasterization, texture coordinate rasterization and color rasterization. Texture unit 1122 performs various tasks related to texturing, including multi-texture handling, post-cache texture decompression, texture filtering, embossed bump mapping, shadows and lighting through the use of projective textures, and BLIT with alpha transparency and depth. Texture unit 1122 outputs filtered texture values to the texture environment unit 1124. Texture environment unit 124 blends the polygon color and texture color together, performing texture fog and other environment-related functions. Pixel engine 1126 performs z buffering and blending, and stores data into an on-chip frame buffer memory.

Figure 1D:
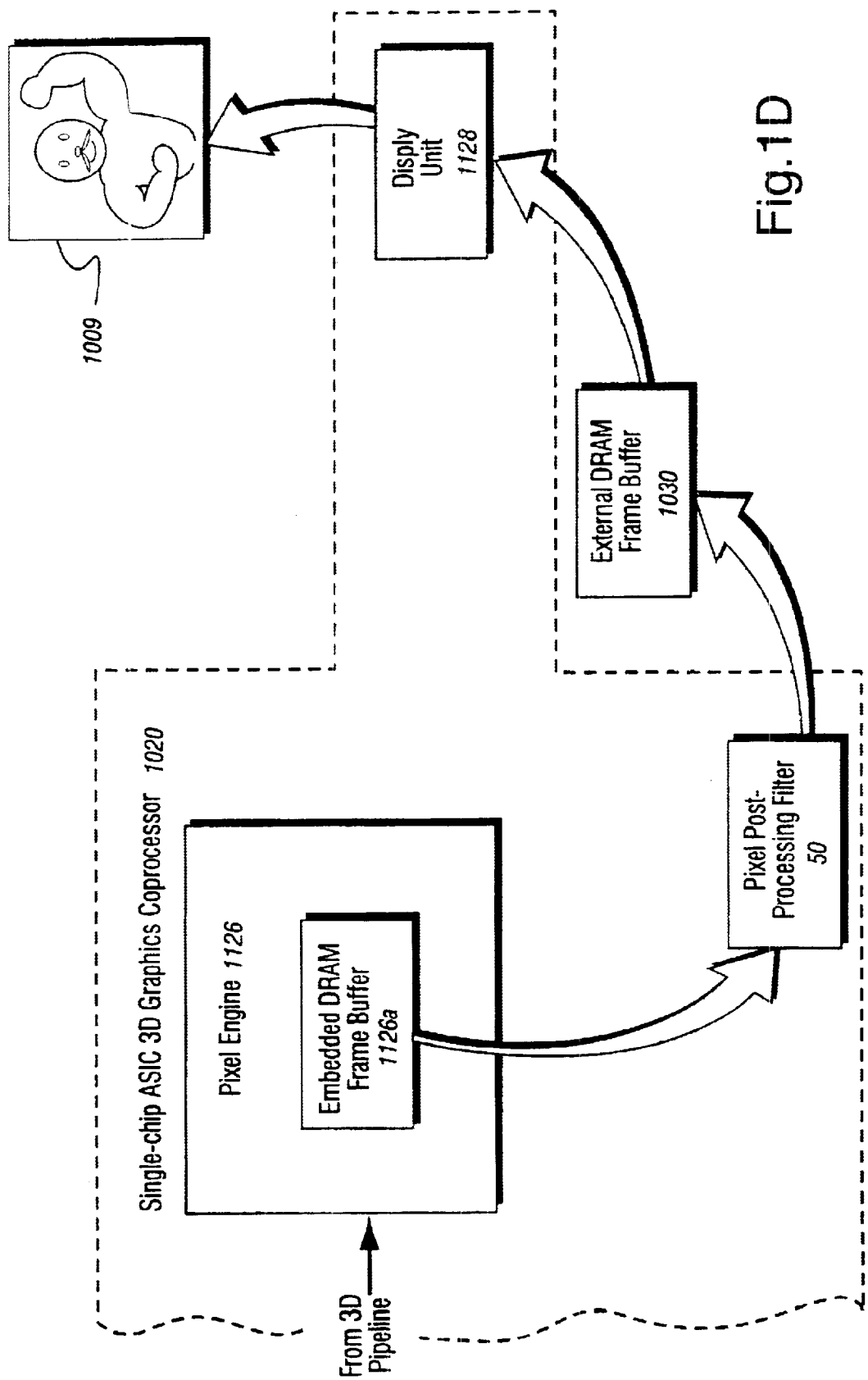

As shown in FIG. 1D, graphics pipeline 1116 may include an embedded DRAM memory 1126a to store frame buffer information locally. The on-chip frame buffer 1126a is periodically written to an off-chip main memory 1030 for access by an on-chip display unit 1128. In one example embodiment, pixel filter 50 may operate to apply border line cartoon outlining during this writing process. The frame buffer output of graphics pipeline 1116 pixel engine 1126 (which is ultimately stored in main memory 1030) is read each frame by display unit 1128. Display unit 1128 provides digital RGB pixel values for display on display 1009.

It is possible that certain of the above-described video game system components could be implemented as other than the home video game console configuration described above. Generally speaking, home video game software is written to run on a particular home video game system. This video game software can sometimes be "ported" (translated) to a different system in a way that takes the different system's hardware and software configuration into account. Such "porting" usually requires access to the video game source code. Another way to run game software on a system with a different configuration is to cause the second system to emulate the first system. If the second system can successfully emulate or simulate the hardware and software resources of the first system, then the second system will be able to successfully execute the binary executable image of the video game software and no access to the game software source code will be required.

In a home video game context, an emulator is a system different from the one for which the game program was written, that is designed to allow the game program to run. As one example, the emulator system may provide a hardware and/or software configuration (platform) that is different from the hardware and/or software configuration (platform) of the system the game software was written for. The emulator system includes software and/or hardware components that emulate hardware and/or software components of the system the game software was written for. For example, the emulator system may comprise a general purpose digital computer such as a personal computer, which executes a software emulator program that simulates the hardware and/or firmware of the system the game software was written for.

Emulator software may be developed which allows games written for the above-described console-based home video game system shown in FIGS. 1–1C to be played on personal or other type of general purpose digital computers. Some such general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of a dedicated home video game console hardware configuration. Emulator software controls the hardware resources on the personal computer platform to simulate the processing, 3D graphics, sound, peripheral and other capabilities of the home video game console platform the game programmer wrote the game software for.

Figure 3A:
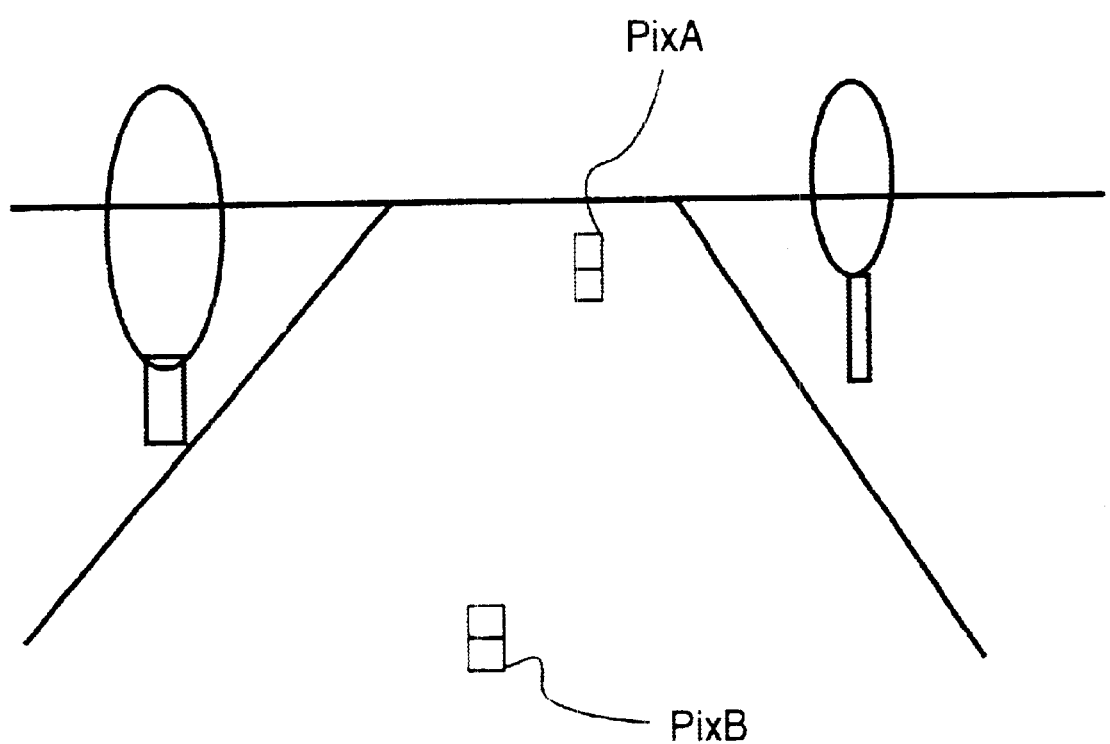
FIG. 3A graphically illustrates example perspective translation.

FIG. 1D illustrates an example overall emulation process using a host platform 1201, an emulator component 1303, and a game software executable binary image provided on a storage medium such as a ROM or optical disk 1305 or other storage device. Host 1201 may be a general or special purpose digital computing device such as, for example, a personal computer or another type of game console. Emulator 1303 runs on host platform 1201, and provides a real-time conversion of commands, data and other information from storage medium 1305 into a form that can be processed by host 1201. For example, emulator 1303 fetches program instructions intended for execution by a home video game platform such as shown in FIGS. 3–3C from storage medium 1205 and converts these program instructions to a format that can be executed or otherwise processed by host 1201. As one example, in the case where the game program is written for execution on a platform using a Z-80, MIPS, IBM PowerPC or other specific processor and the host 1201 is a personal computer using a different (e.g., Intel) processor, emulator 1203 fetches one or a sequence of program instructions from storage medium 1305 and converts these program instructions to one or more equivalent Intel program instructions. Similarly, the emulator 1203 fetches graphics commands and audio commands intended for processing by the graphics and audio coprocessor shown in FIG. 3, and converts these commands into a format or formats that can be processed by hardware and/or software graphics and audio processing resources available on host 1201. As one example, emulator 1303 may convert these commands into commands that can be processed by a specific graphics and/or or sound card of the host 1201 (e.g., using standard DirectX and sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the video game software was originally intended.

Figure 1E:
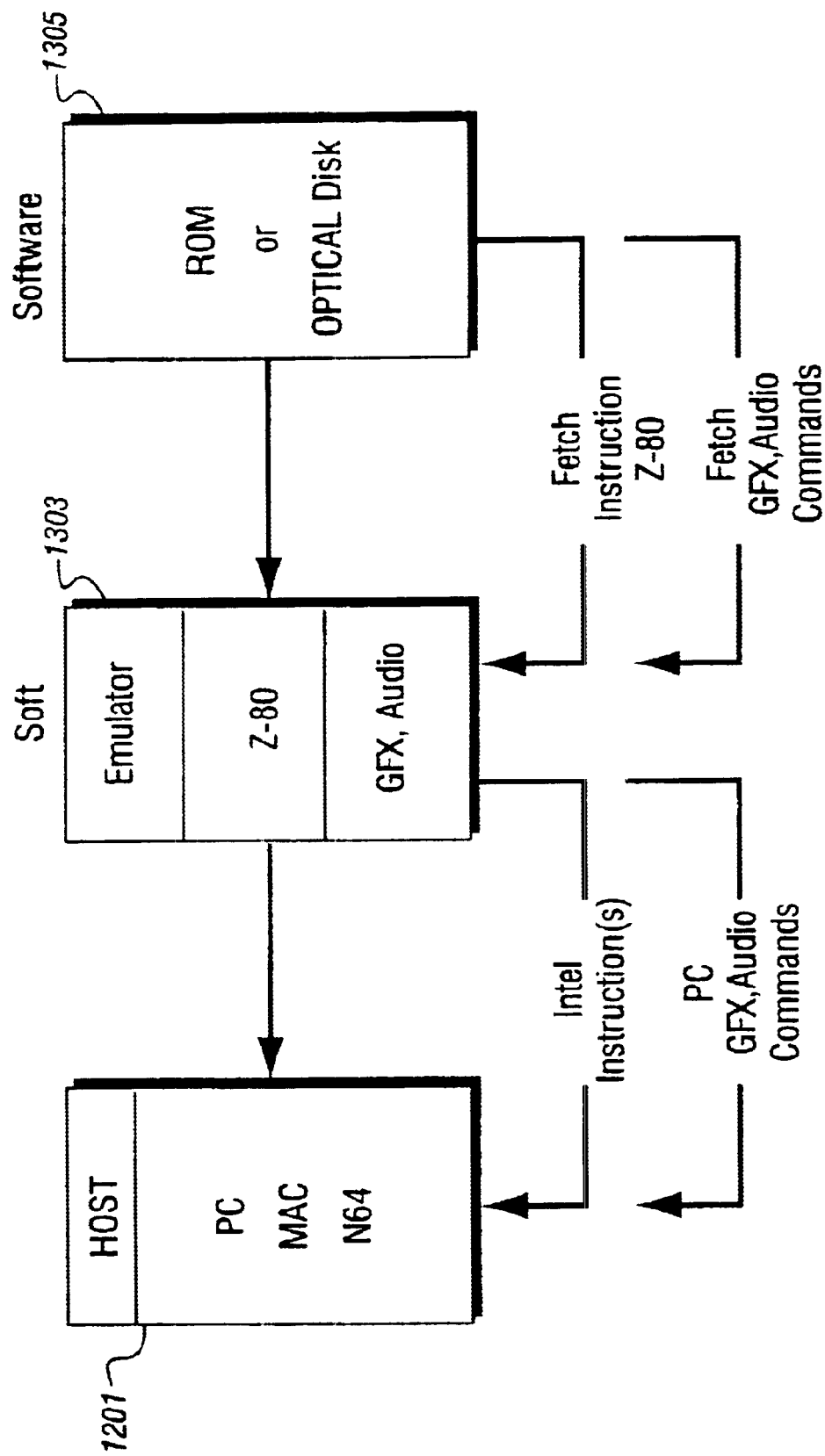
Figure 1F:
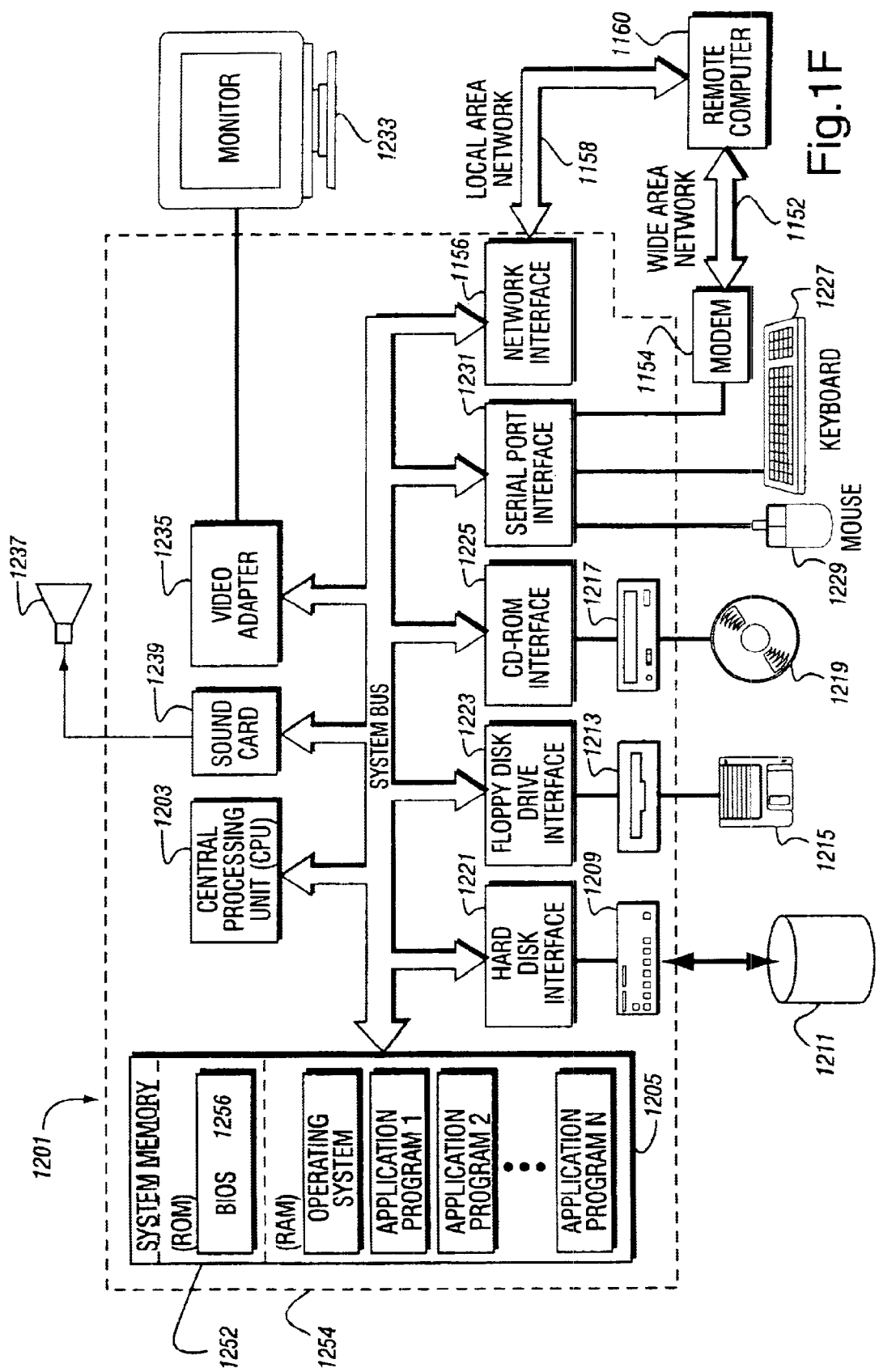

FIG. 1E illustrates a personal computer based host 1201 suitable for use with emulator 1303. The personal computer system 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. Personal computer system 1201 further includes various drives and associated computer-readable media. A hard disk drive 1209 reads from and writes to a (typically fixed) magnetic hard disk 1211; a magnetic disk drive 1213 reads from and writes to a removable "floppy" or other magnetic disk 1215; and an optical disk drive 1217 reads from and, in some configurations, writes to a removable optical disk 1219 such as a CD ROM or other optical media. Hard disk drive 1209, magnetic disk drive 1213, and optical disk drive 1217 are connected to system bus 1207 by a hard disk drive interface 1221, a magnetic disk drive interface 1223, and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227 and pointing device 1229. Other input devices may include a microphone, joystick, game controller, satellite dish, scanner, or the like. These and other input devices are often connected to processing unit 1203 through a serial port interface 1231 that is coupled to system bus 1207, but may be connected by other interfaces, such as a parallel port, game port or a universal serial bus (USB). A monitor 1233 or other type of display device is also connected to system bus 1207 via an interface, such as a video adapter 1235.

Personal computer 120 may also include a modem 1154 or other means for establishing communications over wide area network 1152, such as the Internet. Modem 1154, which may be internal or external, is connected to system bus 123 via serial port interface 1231. A network interface 1156 may also be provided for allowing personal computer 1201 to communicate with a remote computing device 1150 (e.g., another personal computer) via a local area network 1158 (or such communication may be via wide area network 1152 or other communications path such as dial-up or other communications means). Personal computer system 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow host 1201 to provide sufficient graphics and sound speed performance to play video games stored in storage medium 1305.

Example Non-Photorealistic Cartoon Outlining Techniques In Accordance With This Invention The cartoon outlining/border line processing in accordance with the present invention may be advantageously performed in hardware and/or software. For example, assuming sufficient time is available, processor 1010 could perform pixel post processing to blend border line colors into color frame buffer 42 by accessing frame buffer 40 after graphics coprocessor 1020 has rendered an image into the frame buffer but before the image is displayed. Or, hardware and/or software can be provided within graphics coprocessor 1020 to perform this function. As explained above, coprocessor 1020 may make use of existing hardware support such as Alpha blending and z buffer calculation circuitry within the graphics pipeline to perform pixel post processing/filtering to provide border lines around object edges. Or processor 1010 and/or display unit 1128 could perform the pixel filtering operation based on the contents of frame buffer 1040. Once the coprocessor 1020 has completed such pixel post-processing, the modified color values can be written back into frame buffer memory 1030, from which its contents may be accessed by video generation circuitry within the coprocessor for generation of a visual image on display 1009—or the modified values could be sent elsewhere (e.g., directly to the display 1005. To increase transfer efficiencies, the frame buffer 1040 data may be double buffered and DMA may be used. If the frame buffer 1040 is read and processed one line at a time, a line buffer can be used to hold the Z values of the previous line.

Figure 2:
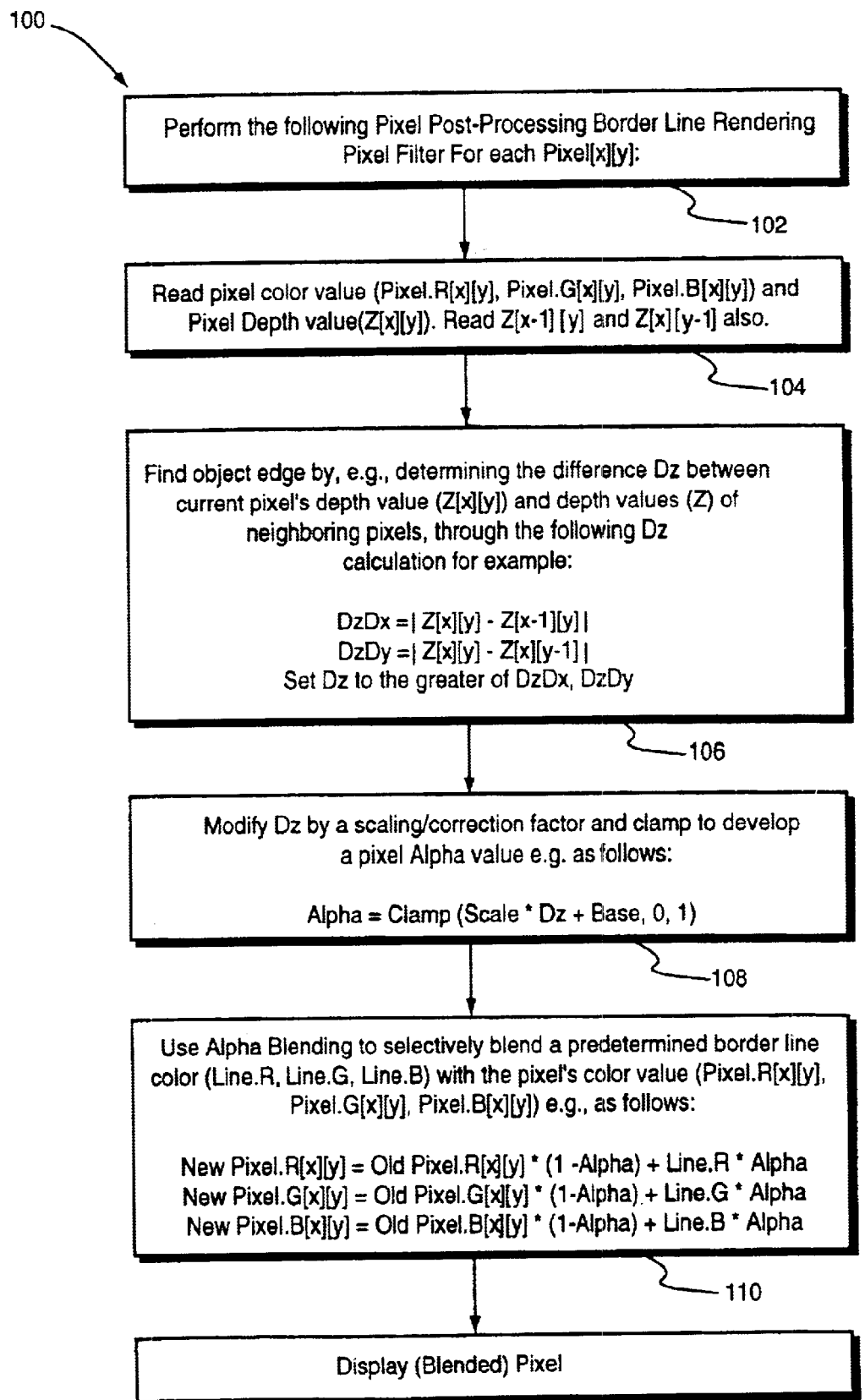
FIG. 2 is a flowchart of example steps of a preferred embodiment pixel filter that provides border line display.
Figure 2A:
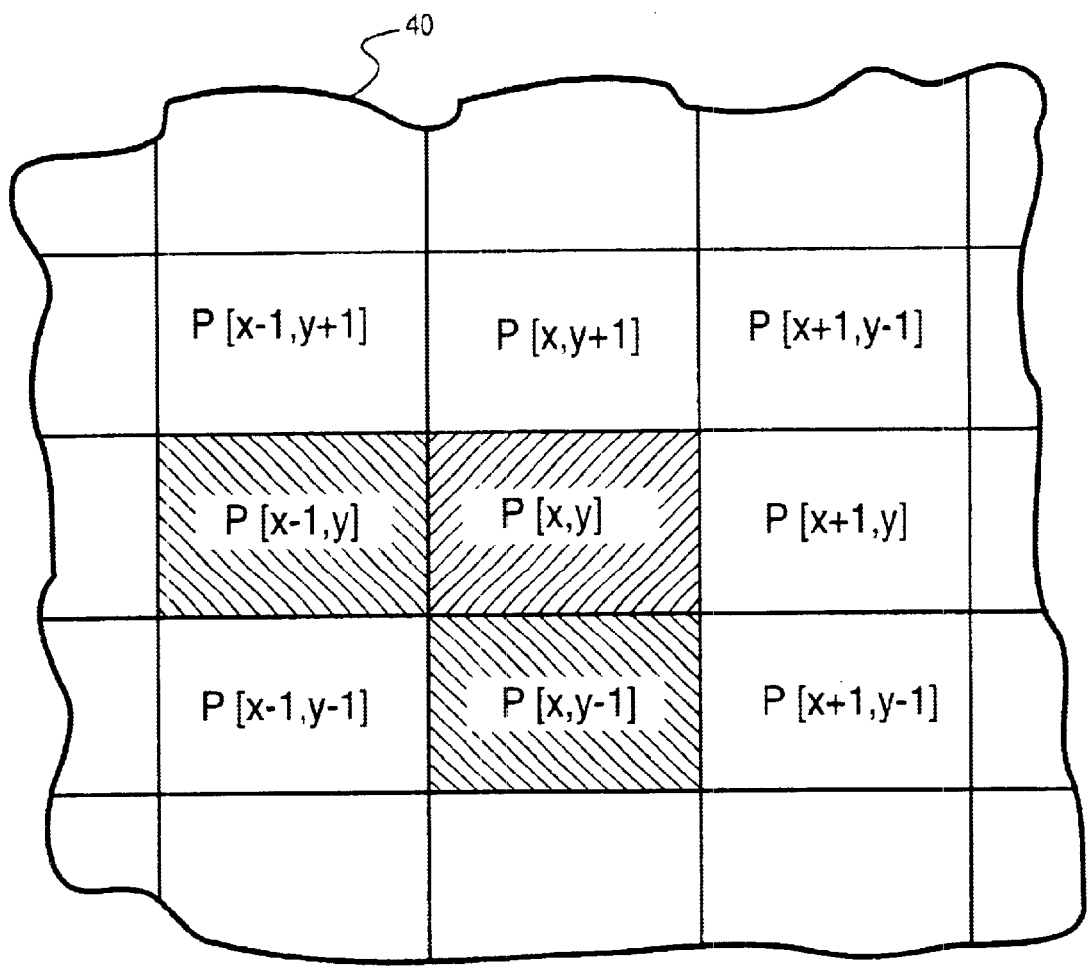
FIG. 2A is a graphical illustration of neighboring pixels.

FIG. 2 is a flowchart of an example pixel filtering routine 100 in accordance with a preferred embodiment to provide a pixel post-processing border line rendering pixel filter 50. The FIG. 2 pixel filter routine 100 may be performed for each pixel[x][y] stored in frame buffer 1040 (block 102). Example pixel filter 100 reads the pixel's color value (Pixel.R[x][y], Pixel.G[x][y], Pixel.B[x][y]) and also reads the pixel's depth value (Z[x][y]) (block 104). In addition, the example pixel filter routine 100 reads the depth values of pixels neighboring pixel[x][y] (also block 104). In this particular example, pixel filter routine 100 reads depth values for two adjacent pixels: depth value Z[x−1][y] for the neighboring pixel immediately to the "left" of the given pixel in the x-y array; and depth value Z[x][y−1] for the neighboring pixel immediately "below" the given pixel in the x-y array. See FIG. 2A. If the frame buffer 1040 is read and processed one line at a time, a line buffer can be used to hold the Z values of the previous line.

Pixel filter routine 100 determines whether pixel[x][y] is at an object edge by, e.g., determining the difference Dz between that pixel's depth value (Z[x][y]) and depth values (Z) of one or more neighboring (in this case, adjacent) pixels, through the following Dz calculation for example (see block 106):

$$DzDx=|Z[x][y]-Z[x-1][y]|$$

$$DzDy=|Z[x][y]-Z[x][y-1]|$$

$$Dz=\max(DzDx, DzDy).$$

In performing the above calculation, pixel filter 100 determines the differences between the pixel's depth and the depth of each of two neighboring pixels; takes the absolute values of these differences (this is done to take into account the fact that one object can be either closer or further away than another object); and then selects the greater of these two resulting magnitudes. The result is a distance value Dz that measures how far away in the z direction the pixel is from a neighboring pixel(s). This calculation can be used to test whether the pixel is on the edge of an object. For example, Dz will generally be large when the pixel is at an object edge (since neighboring pixels will typically have very different depths), and Dz will generally be small when the pixel is not on an object edge (since neighboring pixels will have similar depths).

In another example, it is possible to calculate distance value Dz by summing the two neighboring pixel distance magnitudes, e.g.:

$$Dz=DzDx+DzDy.$$

Other variations are also possible (e.g., different calculations, using different neighboring pixels or different numbers of neighboring pixels, etc.)

Pixel filter routine 100 in this example provides color changes in proportion to the Dz distance value calculated as described above. In one example, pixel filter 100 modifies the resulting Dz distance value by scaling/correction coefficients, and clamps the resulting value to develop a pixel blend factor e.g. as follows (see block 108):

$$\text{Alpha}=\text{Clamp}((\text{Scale Coefficient}*Dz+\text{Base Coefficient}), 0, 1).$$

Assuming a positive scale coefficient, the resulting Alpha value will be large (e.g., near or clamped to 1) when Dz is large, and the Alpha value will be small (e.g., near or clamped to 0) when Dz is small. Different particular calculations for developing the pixel blend factor may be used. For example, an alternate way to calculate the pixel blend factor is as follows:

$$\text{Gray}=\text{Clamp}((Dz-\text{coefficient A})*\text{coefficient B}, 0, 1)$$

Pixel filter 100 in this example uses the resulting pixel blend factor in a blending process (e.g., Alpha blending) to selectively blend a predetermined border line color (e.g., Line.R, Line.G, Line.B) with the pixel's color value (Pixel.R[x][y], Pixel.G[x][y], Pixel.B[x][y]) obtained from color frame buffer 1042 (see block 110). One example set of calculations to perform this blending is:

$$\text{New Pixel.R}[x][y]=\text{Old Pixel.R}[x][y]*(1-\text{Alpha})+\text{Line.R}*\text{Alpha}$$

$$\text{New Pixel.G}[x][y]=\text{Old Pixel.G}[x][y]*(1-\text{Alpha})+\text{Line.G}*\text{Alpha}$$

$$\text{New Pixel.B}[x][y]=\text{Old Pixel.B}[x][y]*(1-\text{Alpha})+\text{Line.B}*\text{Alpha}$$

In accordance with these calculations, the blended ("New") pixel color values will be mostly the initial pixel color values when distance Dz is small, and will be mostly the border line color when distance Dz is large.

The blending calculations above can be simplified (e.g., to provide further optimization) if the border line color is restricted to black (i.e., Line.R=0, Line.G=0, Line.B=0) and/or by using only a white (Line.R=255, Line.G=255, Line.B=255) canvas color. It may also be possible to get more optimization using non-RGB color formats such as YUV (in this case, brightness Y should be controlled to ensure the border line is drawn to be clearly visible).

After blending, the blended pixel may be buffered and then displayed on display device 1009 (block 112). In one example, the pixel filter routine 100 is performed for all pixels in frame buffer 1040, and the resulting blended frame buffer contents are then displayed on display 1009.

Perspective translation may in certain instances affect the results provided by the above-described process. Consider the case shown in FIG. 3A including a far pixel PIXA and a closer pixel PIXB. Due to perspective translation, DzDy for the far pixel PIXA is larger than DzDy for the near pixel PIXB. This may make it more difficult to accurately detect border lines over the whole image using raw DzDx and DzDy values. To overcome this problem, some correction of the Z value depending on Z range is helpful. One example correction may use the log 2(n) function to range convert:

$$DzDx=|\log 2(Z[x][y])-\log 2(Z[x-1][y])|$$

$$DzDy=|\log 2(Z[x][y])-\log 2(Z[x][y-1])|$$

The log 2(n) function is convenient if processor 10 has a floating point calculating capability and Z values are stored in a floating point format, e.g.,

[3-bit exponential] [11-bit mantissa]

Figure 3B:
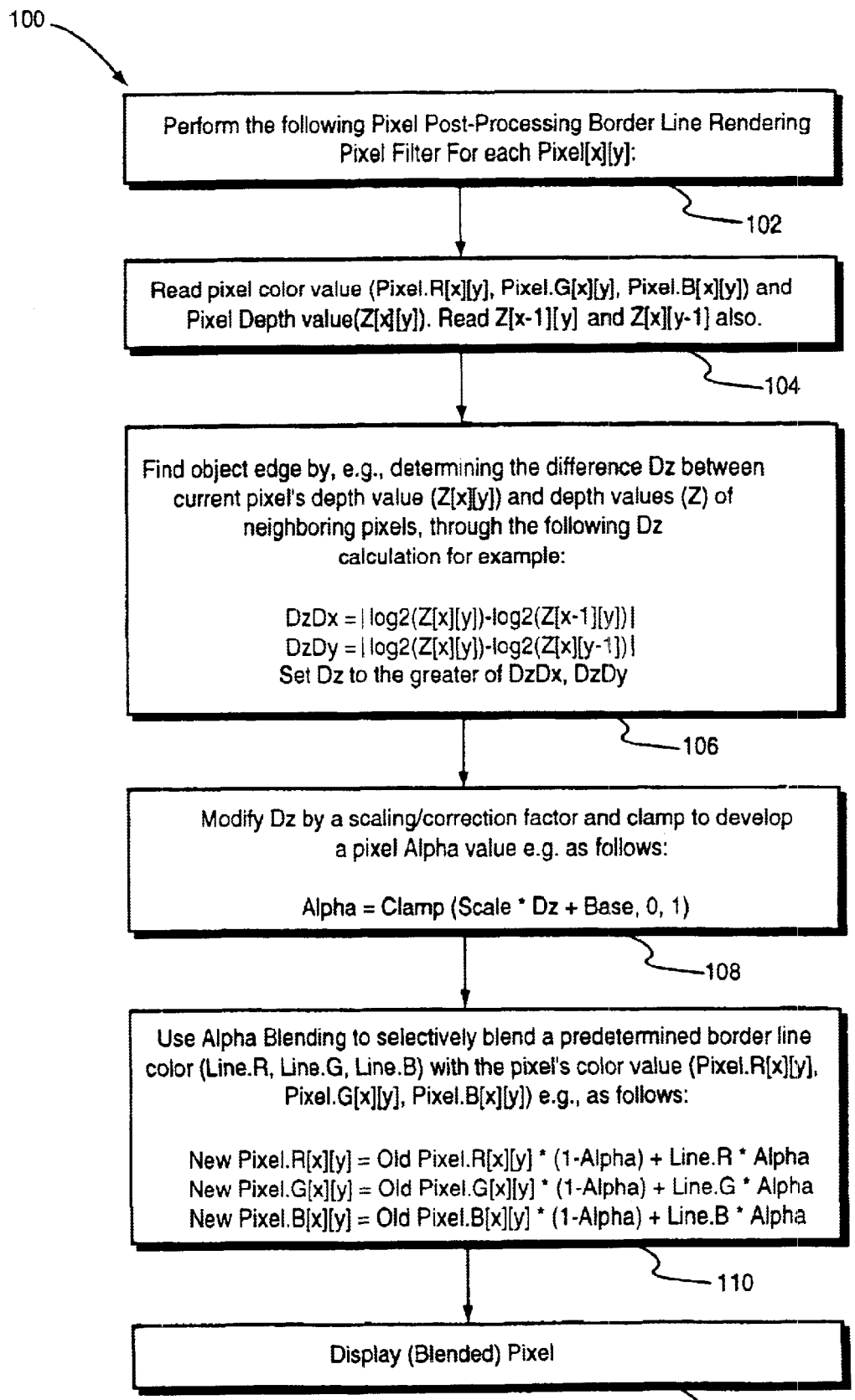
FIG. 3B is an example modification of the FIG. 2 flowchart to provide range conversion to take perspective translation into account.

FIG. 3b shows the FIG. 2 flowchart modified to include this log 2(n) range conversion.

Figure 4:
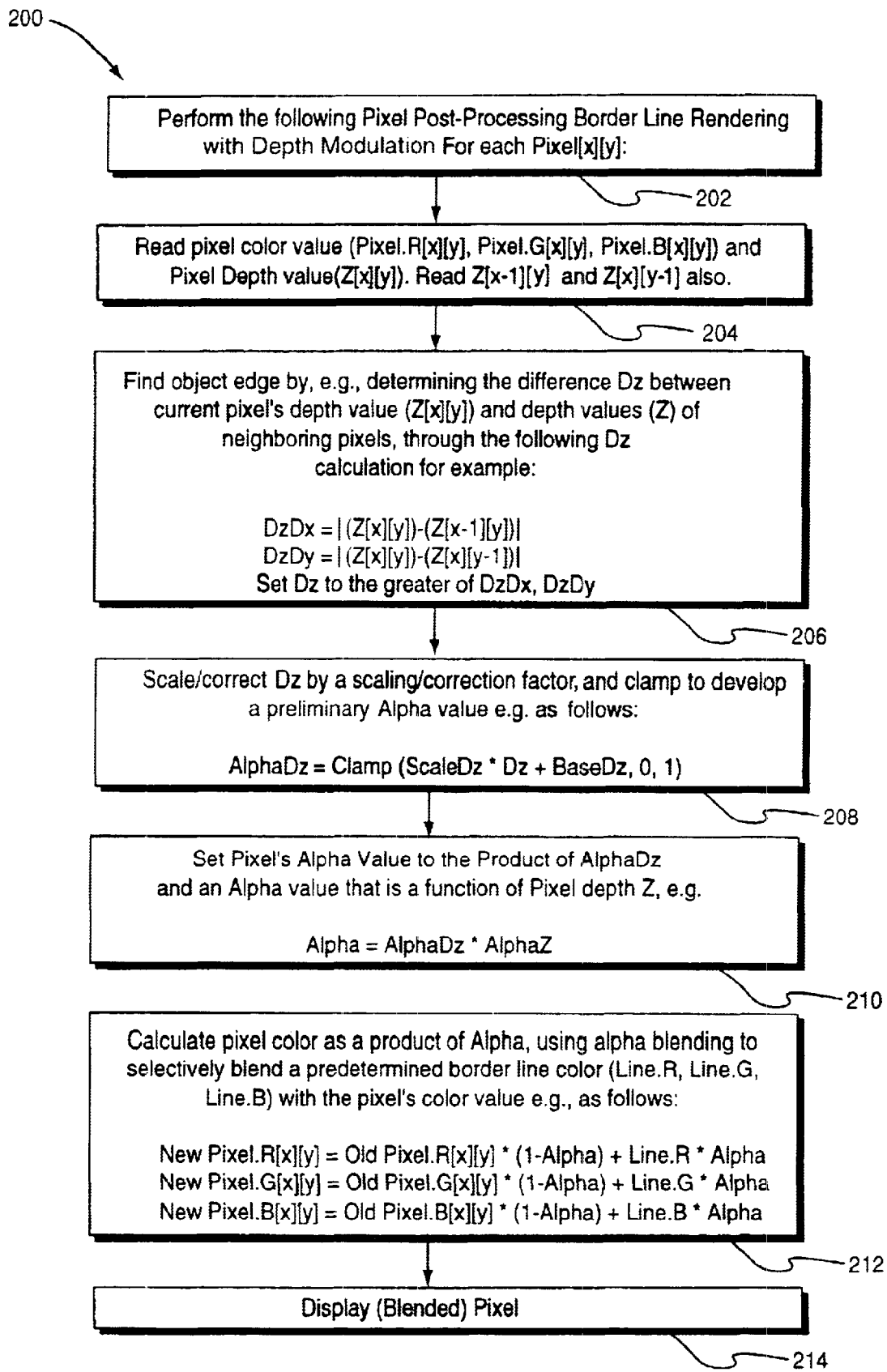
FIG. 4 is a further flowchart of example pixel filter steps providing depth modulation.

FIG. 4 shows another example post-processing pixel filter 200 that provides depth modulation of the Alpha values used to control blending. FIG. 4 blocks 204, 206 & 208 are the same as corresponding blocks 104, 106 & 108 of FIG. 2 (or 3B if range correction is used). FIG. 4 block 210 is added to calculate Alpha as being a function (e.g., product) of the value calculated in block 208 and a further value that is a function of pixel depth z, e.g.:

Alpha=Alpha$Dz$*Alpha$Z$.

The resulting Alpha value, which is used to control blending (see block 212) as explained above in connection with FIG. 2 block 210, depends also on the depth of the pixel.

Figure 5A:
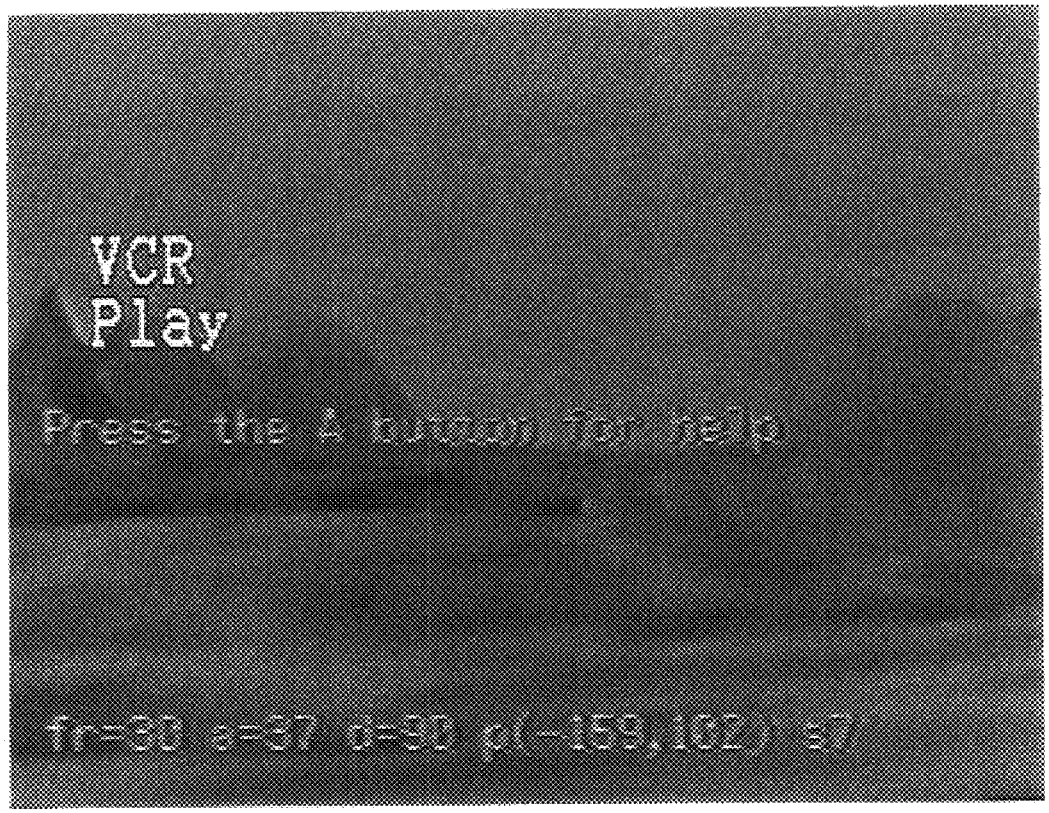
FIGS. 5A–5F show example screen effects provided in accordance with the present invention.
Figure 5B:
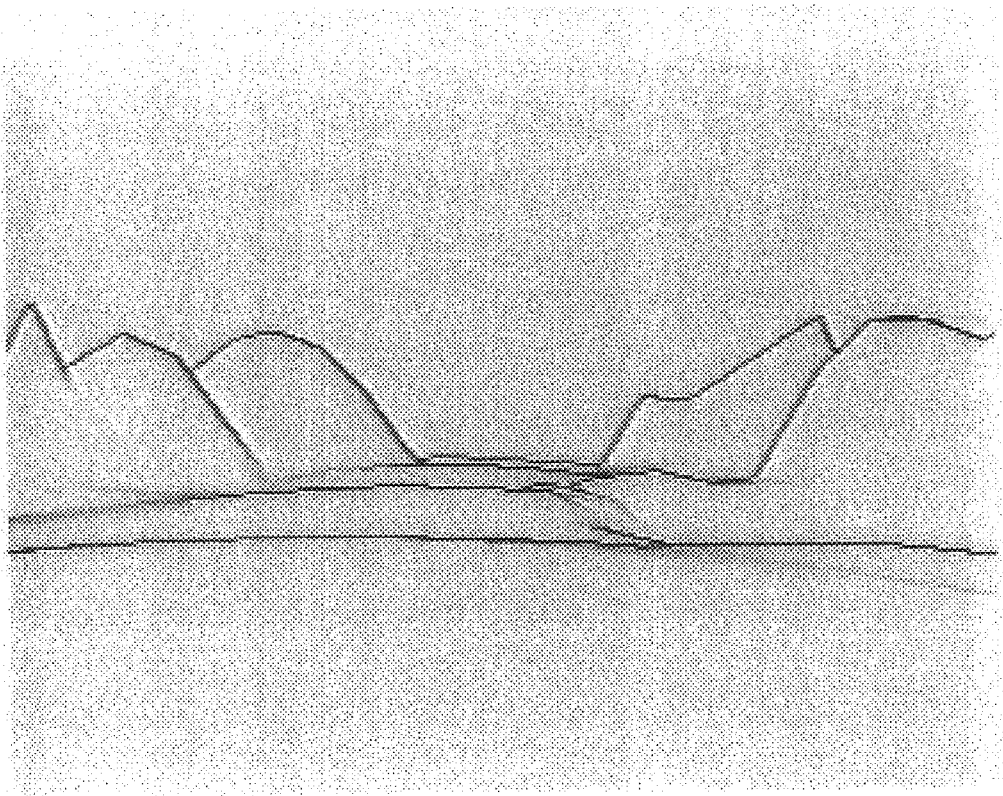
Figure 5C:
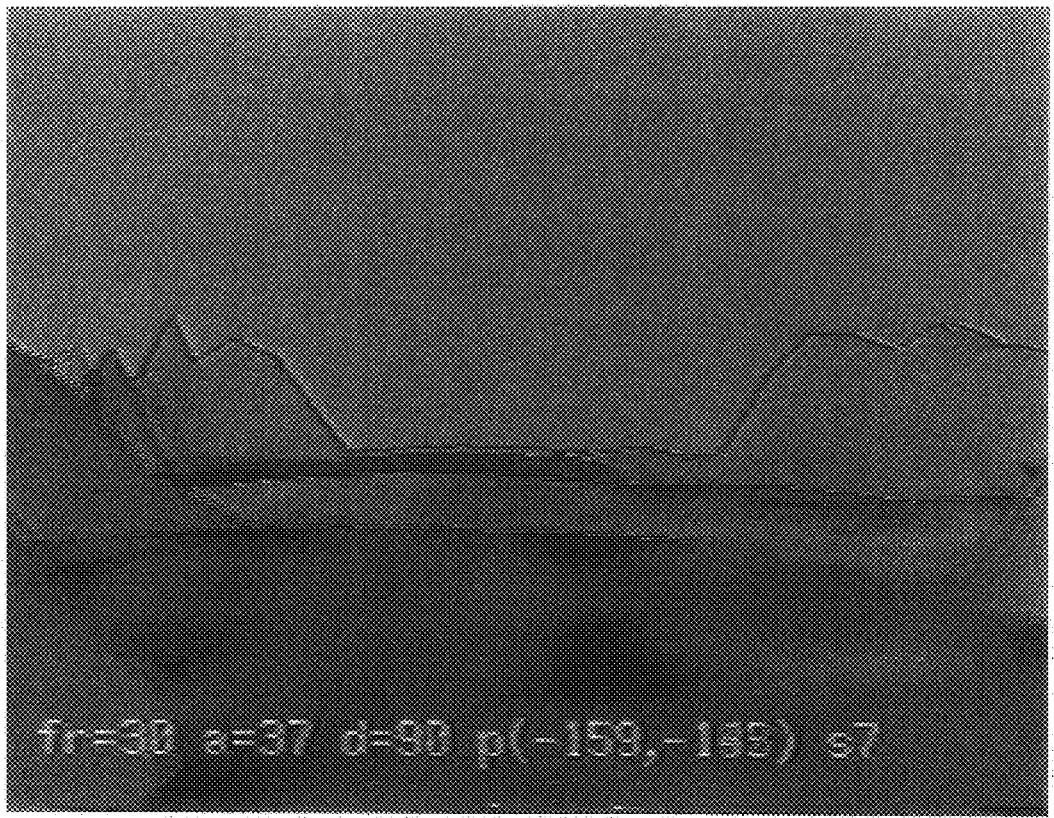

FIGS. 5A–5F show example border line screen effects that can be achieved. FIG. 5A shows an example landscape scene without border line effects. FIG. 5B shows the resulting border line blended into a white canvas color—providing what is effectively a line drawing of the FIG. 5A landscape scene. FIG. 5C shows the FIG. 4A landscape with a black border line color blended into the scene.

Figure 5D:
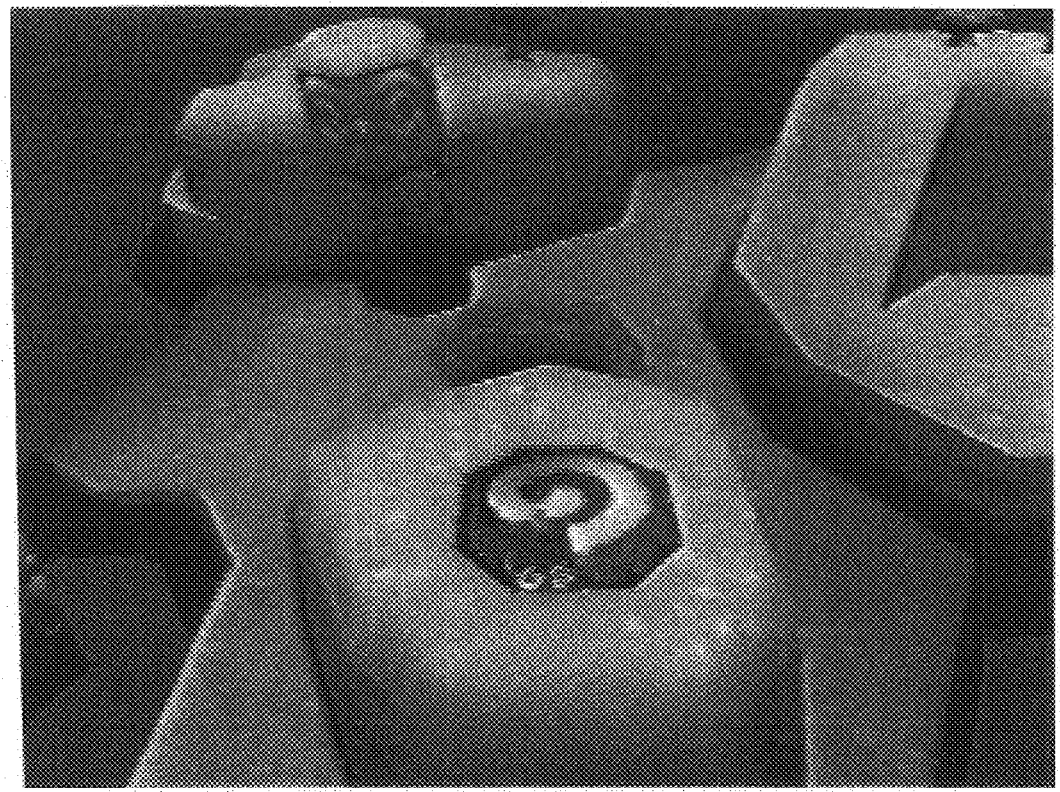
Figure 5E:
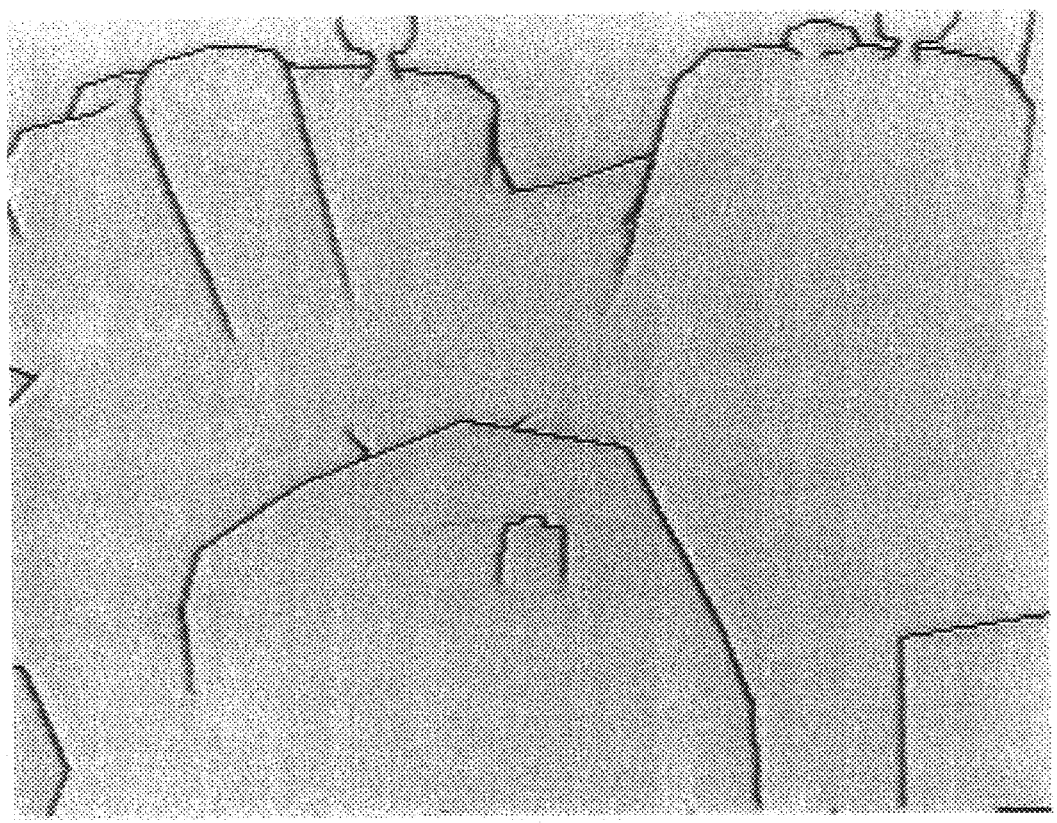
Figure 5F:
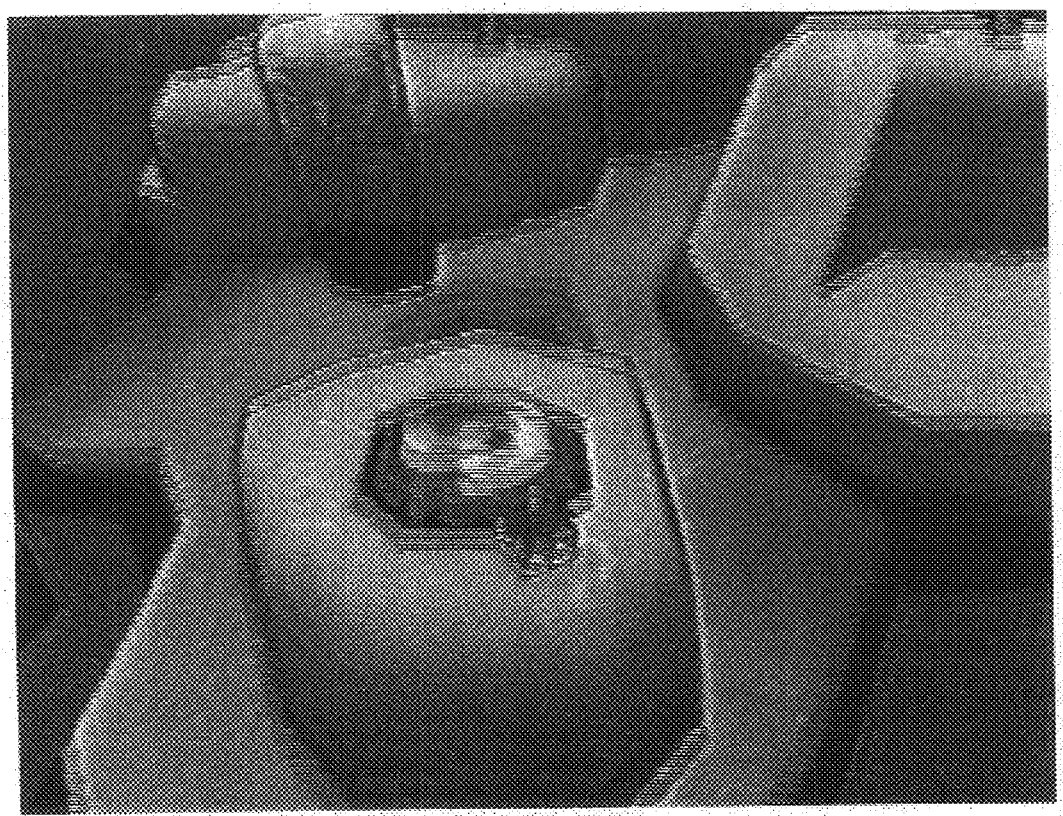

FIG. 5D shows an example fanciful adventure game landscape. FIG. 5E shows the resulting border line blended into a white canvas color. FIG. 5F shows the FIG. 5D landscape with a black border line blended into it.

As discussed above, the pixel post processing filter 100 can be implemented in a number of ways. The following is one example of a computer source code implementation for a pixel post-processing filter:

```
cfb_PixelProc_1:
            add     sys0, cptr,             cbuf_width
            sub     sys1, sys0,             cbuf_size
            lqv     depth00[0],                  0 (sys0)
            lsv     depth10[0],             32+14 (zero)
            lqv     depth10[2],                  0 (sys0)
            lqv     depth01[0],                  0 (sys1)
            lqv     color00[0],                  0 (cptr)
            sqv     depth00[0],                  0 (sys1)
            sqv     depth00[0],                 32 (zero)
            vnxor   depth00,  depth00,      _0x7fff
            vnxor   depth10,  depth10,      _0x7fff
            vnxor   depth01,  depth01,      _0x7fff
            vsub    depthDX,  depth00,      depth10    # X
            vsub    depthDY,  depth00,      depth01    # Y
            vabs    depthDX,  depthDX,      depthDX
            vabs    depthDY,  depthDY,      depthDY
#if def  FILTER_2
            vor     color00,  vzero,        _0xffff
#endif
            vadd    depthDX,  depthDX,      depthDY
            vadd    depthDX,  depthDX,      Coeff_A
            vmudh   depthDX,  depthDX,      Coeff_B
            vge     depthDX,  depthDX,      _0x0000
            vmud1   color0r,  color00,      _0x0020
            vand    color0g,  color00,      v0x07c0
            vand    color0b,  color00,      v0x003e
            vmulf   color0r,  color0r,      depthDX
            vmulf   color0g,  color0g,      depthDX
            vmulf   color0b,  color0b,      depthDX
            vand    color00,  color0g,      v0x07c0
            vmadn   color00,  color0b,      _0x0001
            vmadn   color00,  color0r,      v0x0800
            vor     color00,  color00,      _0x0001
            addi    cptr, cptr, 16
            bne     cptr, cptr_end, cfb_PixelProc_1
            sqv     color00[0], -16(cptr)
            jr      return_sv
            nop
```

Further Cartoon Outlining Embodiment

Figure 6:
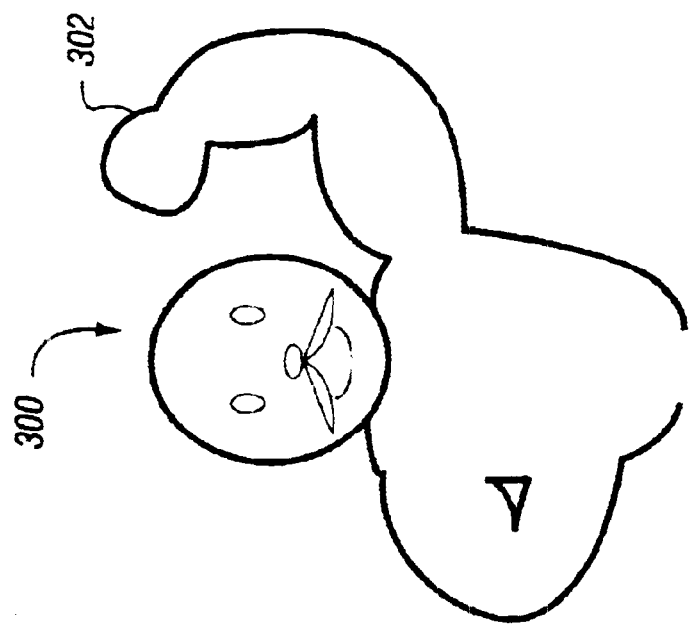

Depending on the particular calculations used, the border line application algorithms described above may not provide completely acceptable results in certain cartoon outlining situations. FIG. 6 illustrates one such example. The FIG. 6 example cartoon character 300 has border lines applied to silhouette edge(s) 302 as described above. FIG. 6 shows this cartoon character 300 as also having a right hand, wrist, and portion of forearm being held in front of the character. The techniques described above may in some cases (e.g., depending on how far the character's arm is positioned from the character's torso) determine that the edges surrounding the right hand, wrist and forearm portion are internal edges rather than silhouette edges—and thus will not apply a border line to those edges. FIG. 6 illustrates that portions of the cartoon character 300 may disappear or become less distinct if cartoon outlining is applied only to silhouette edge(s) 302 of the character—whereas the viewer would (from experience with coloring books, hand-drawn animated cartoons, and/or comic books) expect a border line to also be applied to demarcate the hand, wrist and forearm.

Figure 7:
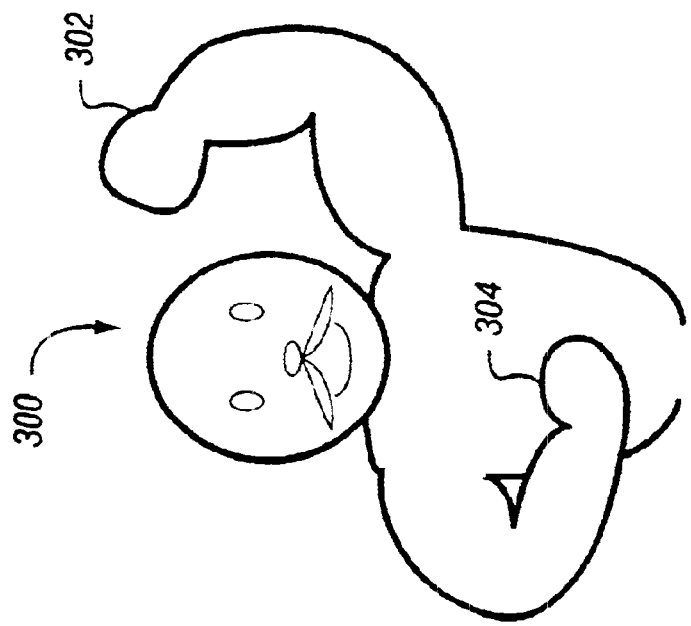
FIGS. 6 and 7 illustrate an example cartoon character with cartoon outlining.

To make cartoon character 300 appear as if it were hand-drawn, it would be helpful to apply border lines to certain internal edges 304 as well—i.e., those internal edges in this example that define the character's hand, wrist and portion of forearm that the character is holding in front of himself. FIG. 7 shows character 300 with a border line applied to these internal edges 304. These internal edges 304 would be silhouette edges if the character 300 was holding its arm in an outstretched position, but are internal edges in the arm orientation shown in FIG. 7.

In accordance with another aspect provided by the present invention, cartoon outlining is automatically applied to certain internal edges as shown in FIG. 7. In more detail, pixels representing different portions of an object are assigned different identification values. Such identification values can be assigned, as one example, by allocating bits within frame buffer 1040 and/or embedded DRAM 1126$a$ that are normally used to encode Alpha information. The assigned identification values may be used to determine whether or not to draw a border line at that pixel location. For example, the system may compare the identification value of a pixel to the identification value of a nearby (e.g., adjacent) pixel. If the identification values of two adjacent pixels have a certain predetermined relationship, then no border line is drawn. For example, if the identification values are the same, then the two pixels are on the same surface and no border line is drawn. However, if the identification values of two adjacent pixels have a certain other predetermined relationship, then a border line is drawn.

Figure 8A:
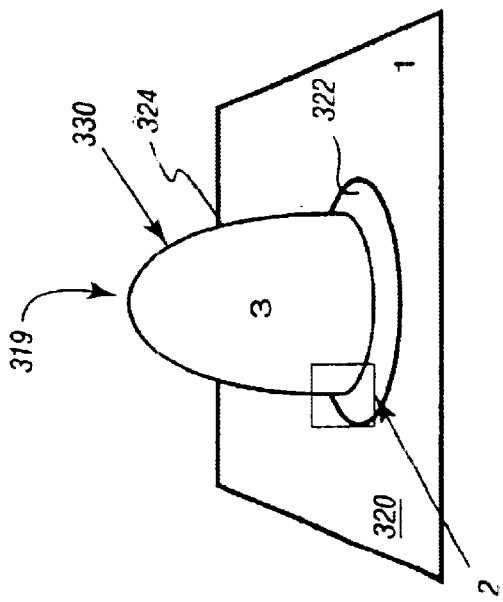
FIGS. 8A–8C show an example further embodiment of the present invention using object portion identification values to specify where cartoon outlining border lines should be applied.
Figure 8B:
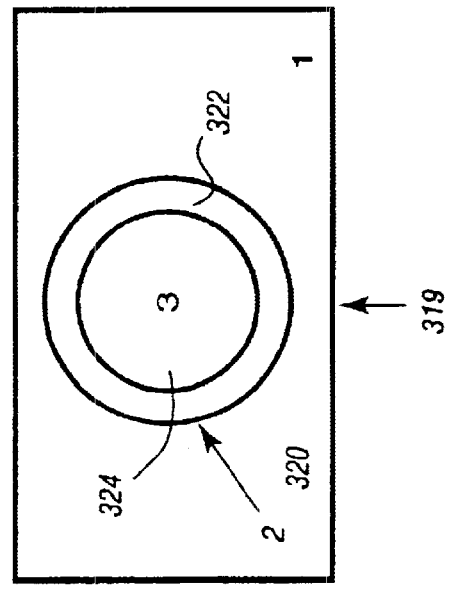
Figure 8C:
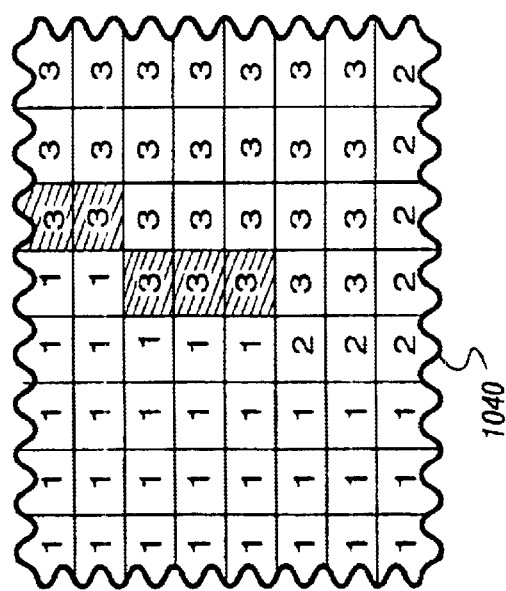

FIGS. 8A–8C illustrate an example. FIG. 8A shows a perspective view of an object 319 comprising three object portions 320, 322, 324. FIG. 8B shows a plan view of the same object 319. Object portion 320 is a square, object portion 322 is a circle, and object portion 324 is a cone. Suppose the graphics artist wants to draw a border line 330 (see FIG. 8A) where cone 324 visually meets square 320, but not where the cone meets circle 322 or where the circle meets the square. In this example, pixels within square 320, circle 322 and cone 324 are coded with different respective identification values. For example, pixels within square 320 are coded with an identification value of "1"; pixels within circle 322 are coded with "2"; and pixels within cone 324 are coded with "3". FIG. 8C shows an example Alpha portion of frame buffer 1040 and/or 1126$a$ storing the coded information (the shaded cells indicate those cells to which a border line color may be applied.

During a pixel post-processing phase, the various identification values within the frame buffer are tested. No border line is drawn for pixels having the same identification value as adjacent pixels (all such pixels are on the same surface).

Also, no border line is drawn if a pixel has an identification value that differs by a predetermined criteria or set of criteria from the identification value of adjacent pixels (e.g., if the identification value of pixel k differs by less than 2 from the identification value of pixel k+1, then no border line is drawn). However, a border line is drawn if a pixel has an identification value that differs by a further predetermined criteria or set of criteria from the identification value of adjacent pixels (e.g., if the identification value of pixel k differs by 2 or more from the identification value of pixel k+1, then a border line may be drawn at pixel k).

FIG. 9 is a flowchart of an example pixel post-processing routine for drawing border lines in accordance with this embodiment. Routine 350 includes a loop (blocks 352–362) that is performed for each pixel[i][j] in an image stored in frame buffer 1040 and/or 1126a. As discussed above, the image generation process may, as part of rendering the image into the frame buffer, set identification values for each distinct part of an object in frame buffer bits normally allocated for storing Alpha values. Routine 350 tests these Alpha (now ID) values to determine whether or not to draw border lines. In this example, routine 350 retrieves the Alpha (ID) value of pixel[i][j] as well as the Alpha (ID) values of adjacent pixels (i.e., pixel[i−1][j] and pixel[i][j−1]) (block 352). Routine 352 then performs (at block 354) the following calculation to determine the difference between the Alpha (ID) value of pixel[i][j] and the Alpha (ID) value(s) of adjacent pixels:

$$diffX = ABS(Alpha[i][j] - Alpha[i-1][j])$$

$$diffX = ABS(Alpha[i][j] - Alpha[i][j-1]).$$

Routine 350 then tests the resulting calculated difference values diffX and diffY to determine if either exceeds a predetermined difference (e.g., an arbitrary fixed or programmable threshold such as 1) (block 356). If at least one of the difference values exceeds the predetermined difference, then routine 350 sets the color of pixel[i][j] to the border line color (block 358). Thus, when alpha slope is −1 to +1, pixels are considered to be on the same surface in this particular example. Steps 352–358 are repeated for each pixel in the image (blocks 360, 362).

In one variation of routine 350, certain objects can be coded with a special Alpha identification value (e.g., 0x00) to specify that the pixels within the object are to be ignored for the purpose of drawing border lines (see FIG. 9A). This could be useful, for example, to render a non-border-lined object as a bit map (e.g., for explosion animation).

FIG. 10 shows how routine 350 described above can be applied to efficiently draw border lines on object 300 shown in FIGS. 6 and 7. In this example, different parts of object 300 are coded with different Alpha (ID) values. For example, object 300 may include two arms 311a, 311b and a torso 309. Each arm may comprise a hand 313, a wrist portion 315, a lower arm portion 312, an elbow portion 308, an upper arm portion 310, and a shoulder portion 317. Each of these various portions can be coded with a different Alpha ID as follows:

| Body Part | Alpha ID |
| --- | --- |
| left hand 313a | 1 |
| left wrist 315a | 2 |
| left lower arm 312a | 3 |

-continued

| Body Part | Alpha ID |
| --- | --- |
| left elbow 308a | 4 |
| left upper arm 310a | 5 |
| left shoulder 317a | 6 |
| torso 309 | 7 |
| right shoulder 317b | 8 |
| right upper arm 310b | 9 |
| right elbow 311b | 10 |
| right lower arm 312b | 11 |
| right wrist 315b | 12 |
| right hand 313b | 13 |

With the example Alpha ID coding above, routine 350 will draw border lines as shown with dark lines in FIG. 10, but will not draw border lines at the other (dotted line) intersections between objection portions.

Figure 11C:
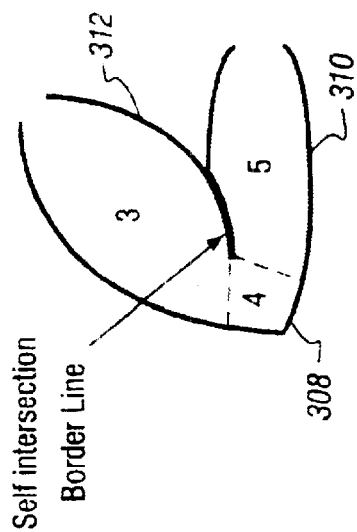
Figure 11B:
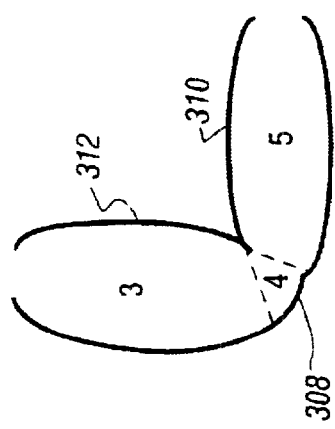
Figure 11A:
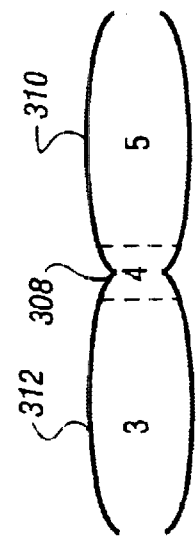

The coding above can also be used to apply a border line to intersections between connected portions of the same object 300. Conventional coloring books, hand-drawn animated cartoons and the like sometimes apply cartoon outlining to such self-intersections in order to give greater definition to the articulated joint, create the illusion of muscle development, and the like. For example, FIGS. 11A–11C show a close-up of the articulated joint 308 (i.e., elbow) of character 300 joining the character's upper arm 310 with forearm 312. Using the coding described above, when the articulated joint 308 is bent so that appendages 310, 312 are oriented adjacent to (e.g., in contact with) one another as illustrated in FIGS. 11B and 11C, routine 350 will (based on the difference between Alpha ID of lower arm 310 and Alpha ID of upper arm 312 being greater than one) apply a border line segment 316 to the intersection of body segments 310, 312 intersect.

The present invention thus provides efficient techniques for applying non-photorealistic effects such as cartoon outlining within a 3D computer graphics system. These techniques may be applied at a pixel post-processing stage (i.e., after a 3D graphics pipeline has rendered the image into a frame buffer), and may not require any pixel information other than that provided by the 3D graphics pipeline (i.e., color, depth and Alpha pixel information). The pixel post-processing techniques provided in accordance with the present invention can thus be effectively and efficiently applied "downstream" of a frame buffer (e.g., as part of an on-chip buffer to off-chip buffer with operation, as part of an anti-aliasing or other post processing operation, etc.) without substantially complicating the 3D graphics pipeline or other parts of the system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. An interactive 3D home video game system comprising:
   at least one hand-operated control device providing user-actuated real time input,
   a storage medium storing three-dimensional data representing at least one cartoon character;
   a buffer memory storing image data;
   a 3D graphics pipeline coupled to said buffer memory, said 3D graphics pipeline rendering image data corresponding to said cartoon character into said buffer memory based at least on said user-actuated real time input and said three-dimensional data representing said cartoon character, and a filter coupled to said buffer memory, said filter applying a cartoon outlining function to said image data to automatically draw a distinct border line around said cartoon character, said system automatically determining which pixels are located at silhouette edges of the character using image data stored in the buffer memory, and automatically selectively blending border coloration into those pixels for display.

2. A 3D home video game system as in claim 1 wherein said graphics pipeline and said buffer memory are disposed on a single semiconductor substrate, and said filter operates on pixel data in the process of writing said pixel data from said substrate to a device external thereto.

3. A 3D home video game system as in claim 1 wherein said image data includes pixel color data, and said filter substitutes a border line color data for said pixel color data.

4. A 3D home video game system as in claim 1 wherein said filter selectively modifies color data corresponding to at least one pixel stored in said buffer memory, based at least in part on said depth data corresponding to said pixel.

5. A 3D home video game system as in claim 1 wherein said filter selectively modifies color data corresponding to at least one pixel stored in said buffer memory, based at least in part on dithering said depth data corresponding to said pixel.

6. A 3D home video game system as in claim 1 wherein said filter determines the difference between depth data corresponding to said pixel and depth data corresponding to at least one pixel nearby said pixel, and modifies said color data corresponding to said pixel if said determination reveals that said difference exceeds a predetermined threshold.

7. A 3D home video game system as in claim 1 wherein said filter selectively modifies said color data based at least in part on an object portion ID value stored in said buffer memory.

8. A 3D home video game system as in claim 7 wherein said buffer memory is configured to store Alpha values associated with plural pixels, and said object portion ID value is stored as an Alpha value within said buffer memory.

9. A 3D home video game system as in claim 1 wherein said filter determines the difference between identification data corresponding to at least one pixel and identification data corresponding to at least one pixel adjacent to said pixel, and modifies said color data corresponding to said pixel if said determination reveals that said difference exceeds a predetermined threshold.

10. A 3D home video game system as in claim 1 wherein said filter alpha-blends color data stored in said buffer memory.

11. A 3D home video game system as in claim 10 wherein said filter selectively modifies color data stored in said buffer memory by setting an alpha value corresponding to said pixel to a value corresponding to the depth of said pixel.

12. A 3D home video game system as in claim 11 wherein said filter selectively modifies color data stored in said buffer memory by setting an alpha value corresponding to at least one pixel to a value corresponding to the difference between the depth of said pixel and the depth of at least one nearby pixel.

13. A 3D home video game system as in claim 12 wherein said nearby pixel is an adjacent pixel.

14. A 3D home video game system as in claim 1 wherein said pixel is designated P[x,y] in said image, and said filter compares the depth of said pixel with the depth of a first pixel designated P[x−1, y] and a second pixel designated P[x, y−1].

15. A 3D home video game system as in claim 1 wherein said pixel is designated P[x,y] in said image, and said filter compares the depth of said pixel with the depth of a first pixel designated P[x+1, y] and a second pixel designated P[x, y+1].

16. A 3D home video game system as in claim 1 wherein said filter calculates the difference between a first logarithmic function of the depth of said pixel and a second logarithmic function of the depth of at least one nearby pixel.

17. A 3D home video game system as in claim 1 wherein said filter depth-modulates application of said cartoon outlining.

18. A 3D home video game system as in claim 1 wherein said filter converts said cartoon outlining for perspective.

19. In a computer graphics system of the type including a pixel memory storing color and depth data corresponding to pixels of a rendered 3D image, a method of generating non-photorealistic visual effects including:

(a) reading at least said color data for at least one of said pixels from said pixel memory; and (b) selectively modifying said color data to provide a cartoon outlining effect for said rendered image, including automatically determining, based on color data stored in the pixel memory, which pixels are located at silhouette edges of objects, and automatically selectively blending border coloration into those pixels for display.

20. A method as in claim 19 wherein said pixel memory is disposed on a graphics chip, and said reading step (a) is performed during a pixel post-processing step of writing said rendered image out of said graphics chip.

21. A method as in claim 19 wherein said selectively modifying step comprises substituting border line color data for said pixel color data.

22. A method as in claim 19 wherein said selectively modifying step is performed based at least in part on said depth data corresponding to said pixel.

23. A method as in claim 19 wherein said selectively modifying step is performed based at least in part on dithering said depth data corresponding to said pixel.

24. A method as in claim 19 wherein said selectively modifying step comprises determining the difference between depth data corresponding to said pixel and depth data corresponding to at least one pixel adjacent to said pixel, and modifying said color data corresponding to said pixel if said determining step reveals that said difference exceeds a predetermined threshold.

25. A method as in claim 19 wherein said selectively modifying step is performed based at least in part on an object portion ID value stored in said pixel memory.

26. A method as in claim 25 wherein said pixel memory is configured to store Alpha values associated with said pixels, and said object portion ID value is stored as an Alpha value within said pixel memory.

27. A method as in claim 19 wherein said selectively modifying step comprises determining the difference between identification data corresponding to said pixel and identification data corresponding to at least one pixel adjacent to said pixel, and modifying said color data corresponding to said pixel if said determining step reveals that said difference exceeds a predetermined threshold.

28. A method as in claim 19 wherein said selectively modifying step includes using Alpha blending to apply a border line to said pixel color data.

29. A method as in claim 28 wherein said selectively modifying step includes setting an alpha value corresponding to said pixel to a value corresponding to the depth of said pixel.

30. A method as in claim 29 wherein said selectively modifying step includes setting an alpha value corresponding to said pixel to a value corresponding to the difference between the depth of said pixel and the depth of at least one nearby pixel.

31. A method as in claim 30 wherein said nearby pixel is an adjacent pixel.

32. A method as in claim 19 wherein said pixel is designated P[x,y] in said image, and said selectively modifying step includes comparing the depth of said pixel with the depth of a first pixel designated P[x−1, y] and a second pixel designated P[x, y−1].

33. A method as in claim 19 wherein said pixel is designated P[x,y] in said image, and said selectively modifying step includes comparing the depth of said X pixel with the depth of a first pixel designated P[x+1, y] and a second pixel designated P[x, y+1].

34. A method as in claim 19 wherein said selectively modifying step includes calculating the difference between a first logarithmic function of the depth of said pixel and a second logarithmic function of the depth of at least one adjacent pixel.

35. A computer graphics system including:
   a graphics engine that renders a 3D image into a pixel memory storing color and depth data corresponding to pixels of said rendered 3D image;
   a pixel filter coupled to said pixel memory, said pixel filter reading at least said color data for at least one of said pixels from said pixel memory, said pixel filter automatically determining which pixels are located at silhouette edges of objects based on said read color data, and selectively modifying said color data by automatically selectively blending border coloration into those pixels to provide a cartoon outlining effect for said rendered image.

36. A system as in claim 35 wherein said graphics engine and said pixel memory are disposed on a common substrate, said graphics system includes a further pixel memory external to said substrate, and said pixel filter writes said rendered image to said further pixel memory.

37. A system as in claim 35 wherein said pixel filter substitutes border line color data for said pixel color data.

38. A system as in claim 35 wherein said pixel filter selectively modifies said color data based at least in part on said depth data corresponding to said pixel.

39. A system as in claim 35 wherein said pixel filter selectively modifies said color data based at least in part on dithering said depth data corresponding to said pixel.

40. A system as in claim 35 wherein said pixel filter determines the difference between depth data corresponding to said pixel and depth data corresponding to at least one pixel adjacent to said pixel, and modifies said color data corresponding to said pixel if said determination reveals that said difference exceeds a predetermined threshold.

41. A system as in claim 35 wherein said pixel filter selectively modifies said color data based at least in part on an object portion ID value stored in said pixel memory.

42. A system as in claim 41 wherein said pixel memory is configured to store Alpha values associated with said pixels, and said object portion ID value is stored as an Alpha value within said pixel memory.

43. A system as in claim 35 wherein said pixel filter determines the difference between identification data corresponding to said pixel and identification data corresponding to at least one pixel adjacent to said pixel, and modifies said color data corresponding to said pixel if said determination reveals that said difference exceeds a predetermined threshold.

44. A system as in claim 35 wherein said pixel filter selectively modifies said color data by Alpha blending.

45. A system as in claim 44 wherein said pixel filter selectively modifies said color data by setting an alpha value corresponding to said pixel to a value corresponding to the depth of said pixel.

46. A system as in claim 45 wherein said pixel filter selectively modifies said color data by setting an alpha value corresponding to said pixel to a value corresponding to the difference between the depth of said pixel and the depth of at least one nearby pixel.

47. A system as in claim 46 wherein said nearby pixel is an adjacent pixel.

48. A system as in claim 35 wherein said pixel is designated P[x,y] in said image, and said pixel filter compares the depth of said pixel with the depth of a first pixel designated P[x−1, y] and a second pixel designated P[x, y−1].

49. A system as in claim 35 wherein said pixel is designated P[x,y] in said image, and said pixel filter compares the depth of said pixel with the depth of a first pixel designated P[x+1, y] and a second pixel designated P[x, y+1].

50. A system as in claim 35 wherein said pixel filter calculates the difference between a first logarithmic function of the depth of said pixel and a second logarithmic function of the depth of at least one adjacent pixel.

51. An interactive 3D home video game system comprising:
   at least one hand-operated control device providing user-actuated real time inputs;
   a storage medium storing three-dimensional data representing at least one cartoon character;
   a frame buffer memory storing image data;
   a 3D graphics pipeline coupled to said frame buffer memory, said 3D graphics pipeline rendering image data corresponding to said cartoon character into said frame buffer based at least on said user-actuated real time inputs and said three-dimensional data representing said cartoon character; and
   a filter coupled to said frame buffer memory, said filter automatically determining which pixels are located at silhouette edges of objects based on said read color data, and applying a cartoon outlining function to said image data by automatically selectively, blending border coloration into those pixels to automatically draw a distinct border line around said cartoon character.

52. A home video game system as in claim 51 wherein said graphics pipeline and said frame buffer memory are disposed on a common semiconductor substrate, said graphics system includes a further pixel memory external to said substrate, and said filter writes said rendered image to said further pixel memory.

53. A system as in claim 51 wherein said filter substitutes a border line color data for said pixel color data.

54. A system as in claim 51 wherein said filter selectively modifies color data corresponding to at least one pixel stored in said frame buffer memory, based at least in part on said depth data corresponding to said pixel.

55. A system as in claim 51 wherein said filter selectively modifies color data corresponding to at least one pixel stored in said frame buffer memory, based at least in part on dithering said depth data corresponding to said pixel.

56. A system as in claim 51 wherein said filter determines the difference between depth data corresponding to said pixel and depth data corresponding to at least one pixel adjacent to said pixel, and modifies said color data corresponding to said pixel if said determination reveals that said difference exceeds a predetermined threshold.

57. A system as in claim 51 wherein said filter selectively modifies said color data based at least in part on an object portion ID value stored in said frame buffer memory.

58. A system as in claim 57 wherein said frame buffer memory is configured to store Alpha values associated with plural pixels, and said object portion ID value is stored as an Alpha value within said frame buffer memory.

59. A system as in claim 51 wherein said filter determines the difference between identification data corresponding to at least one pixel and identification data corresponding to at least one pixel adjacent to said pixel, and modifies said color data corresponding to said pixel if said determination reveals that said difference exceeds a predetermined threshold.

60. A system as in claim 51 wherein said filter alpha blends color data stored in said frame buffer memory.

61. A system as in claim 60 wherein said filter selectively modifies color data stored in said frame buffer memory by setting an alpha value corresponding to said pixel to a value corresponding to the depth of said pixel.

62. A system as in claim 61 wherein said filter selectively modifies color data stored in said frame buffer memory by setting an alpha value corresponding to at least one pixel to a value corresponding to the difference between the depth of said pixel and the depth of at least one nearby pixel.

63. A system as in claim 62 wherein said nearby pixel is an adjacent pixel.

64. A system as in claim 51 wherein said pixel is designated P[x,y] in said image, and said filter compares the depth of said pixel with the depth of a first pixel designated P[x−1, y] and a second pixel designated P[x, y−1].

65. A system as in claim 51 wherein said pixel is designated P[x,y] in said image, and said filter compares the depth of said pixel with the depth of a first pixel designated P[x+1, y] and a second pixel designated P[x, y+1].

66. A system as in claim 51 wherein said filter calculates the difference between a first logarithmic function of the depth of said pixel and a second logarithmic function of the depth of at least one nearby pixel.

67. An emulator for emulating an interactive 3D home video game system comprising:

at least one hand-operated control device providing user-actuated real time inputs;

a storage medium storing three-dimensional data representing at least one cartoon character;

a frame buffer memory storing image data;

a 3D graphics pipeline coupled to said frame buffer memory, said 3D graphics pipeline rendering image data corresponding to said cartoon character into said frame buffer based at least on said user-actuated real time inputs and said three-dimensional data representing said cartoon character; and a filter coupled to said frame buffer memory, said filter applying a cartoon outlining function to said image data by automatically determining which pixels are located at silhouette edges of objects based on said read color data, and automatically drawing a distinct border line around said cartoon character by automatically selectively blending border coloration into those pixels.

* * * * *